(12) United States Patent
Sato et al.

(10) Patent No.: US 8,463,332 B2
(45) Date of Patent: Jun. 11, 2013

(54) WIRELESS COMMUNICATION DEVICE

(75) Inventors: Takehisa Sato, Isehara (JP); Takeshi Osada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1177 days.

(21) Appl. No.: 11/892,343

(22) Filed: Aug. 22, 2007

(65) Prior Publication Data

US 2008/0058029 A1 Mar. 6, 2008

(30) Foreign Application Priority Data

Aug. 31, 2006 (JP) .................................. 2006-236921

(51) Int. Cl.
*H04M 1/00* (2006.01)

(52) U.S. Cl.
USPC ............ 455/573; 455/571; 320/107; 320/108

(58) Field of Classification Search
USPC ............... 455/403, 19, 41.1, 562.1, 572, 573, 455/575.7, 121, 279.1, 343.1, 343.2, 343.5; 235/492, 451, 487; 340/825.54, 825.34, 825.53, 340/825.72, 825.69; 320/128, 109, 112, 113, 320/110, 145, 114, 162
See application file for complete search history.

(56) References Cited

U.S. PATENT DOCUMENTS

| | | | | |
|---|---|---|---|---|
| 5,596,567 A | * | 1/1997 | deMuro et al. | 320/106 |
| 5,778,325 A | * | 7/1998 | Lindell et al. | 455/573 |
| 5,963,012 A | * | 10/1999 | Garcia et al. | 320/106 |
| 6,127,799 A | * | 10/2000 | Krishnan | 320/104 |
| 6,223,990 B1 | * | 5/2001 | Kamei | 235/492 |
| 6,509,217 B1 | | 1/2003 | Reddy | |
| 6,737,302 B2 | | 5/2004 | Arao | |
| 6,791,457 B2 | | 9/2004 | Shimura | |
| 6,837,438 B1 | | 1/2005 | Takasugi et al. | |

(Continued)

FOREIGN PATENT DOCUMENTS

| | | |
|---|---|---|
| EP | 1223057 A | 7/2002 |
| JP | 09-001968 | 1/1997 |

(Continued)

OTHER PUBLICATIONS

International Search Report (Application No. PCT/JP2007/055014) dated Jun. 19, 2007.

(Continued)

*Primary Examiner* — Jean Gelin
(74) *Attorney, Agent, or Firm* — Eric J. Robinson; Robinson Intellectual Property Law Office, P.C.

(57) ABSTRACT

It is an object of the present invention to facilitate charge of a battery of a wireless communication device. In addition, it is another object of the present invention to provide a wireless communication device capable of transmitting and receiving individual information without battery replacement which is required due to the power consumption of a battery. A wireless communication device includes a plurality of antenna circuits and a plurality of batteries electrically connected to any one of the plurality of antenna circuits through a switch, where the plurality of batteries are each electrically connected to a different circuit, the plurality of antenna circuits receive electric waves so that the plurality of batteries electrically connected to the plurality of antenna circuits are charged, and at least one of the plurality of antenna circuits receives an electric wave having a different frequency.

29 Claims, 23 Drawing Sheets

U.S. PATENT DOCUMENTS

| | | | |
|---|---|---|---|
| 7,181,164 B2 * | 2/2007 | Lee et al. | 455/41.2 |
| 7,274,168 B2 * | 9/2007 | Tskukamoto et al. | 320/106 |
| 7,471,062 B2 * | 12/2008 | Bruning | 320/108 |
| 7,479,346 B1 * | 1/2009 | Chow et al. | 429/158 |
| 7,705,565 B2 * | 4/2010 | Patino et al. | 320/150 |
| 7,843,169 B1 * | 11/2010 | Tsukamoto et al. | 320/117 |
| 2002/0049714 A1 | 4/2002 | Yamazaki et al. | |
| 2003/0231001 A1 * | 12/2003 | Bruning | 320/108 |
| 2004/0128246 A1 | 7/2004 | Takayama et al. | |
| 2004/0145454 A1 | 7/2004 | Powell et al. | |
| 2005/0012842 A1 * | 1/2005 | Miyagawa et al. | 348/333.01 |
| 2005/0162131 A1 | 7/2005 | Sennami et al. | |
| 2005/0194926 A1 * | 9/2005 | Di Stefano | 320/108 |
| 2005/0215119 A1 | 9/2005 | Kaneko | |
| 2005/0254183 A1 | 11/2005 | Ishida et al. | |
| 2006/0009251 A1 | 1/2006 | Noda et al. | |
| 2006/0284593 A1 * | 12/2006 | Nagy et al. | 320/109 |

FOREIGN PATENT DOCUMENTS

| | | |
|---|---|---|
| JP | 10-307898 | 11/1998 |
| JP | 2000-090220 A | 3/2000 |
| JP | 2000-137779 | 5/2000 |
| JP | 2001-067446 | 3/2001 |
| JP | 2001-067446 A | 3/2001 |
| JP | 2002-209343 A | 7/2002 |
| JP | 2003-006592 | 1/2003 |
| JP | 2003-070187 | 3/2003 |
| JP | 2003-070187 A | 3/2003 |
| JP | 2003-299255 | 10/2003 |
| JP | 2003-299255 A | 10/2003 |
| JP | 2003-309490 | 10/2003 |
| JP | 2004-135135 A | 4/2004 |
| JP | 2004-343410 | 12/2004 |
| JP | 2005-149238 A | 6/2005 |
| JP | 2005-150022 | 6/2005 |
| JP | 2005-316724 | 11/2005 |
| JP | 2005-352434 | 12/2005 |
| JP | 2005-354888 | 12/2005 |
| JP | 2006-004015 | 1/2006 |
| JP | 2006-503376 | 1/2006 |
| WO | WO 97/00493 | 1/1997 |

OTHER PUBLICATIONS

Written Opinion (Application No. PCT/JP2007/055014) dated Jun. 19, 2007.

Chinese Office Action (Application No. 200710142258.5) Dated Feb. 23, 2011.

* cited by examiner

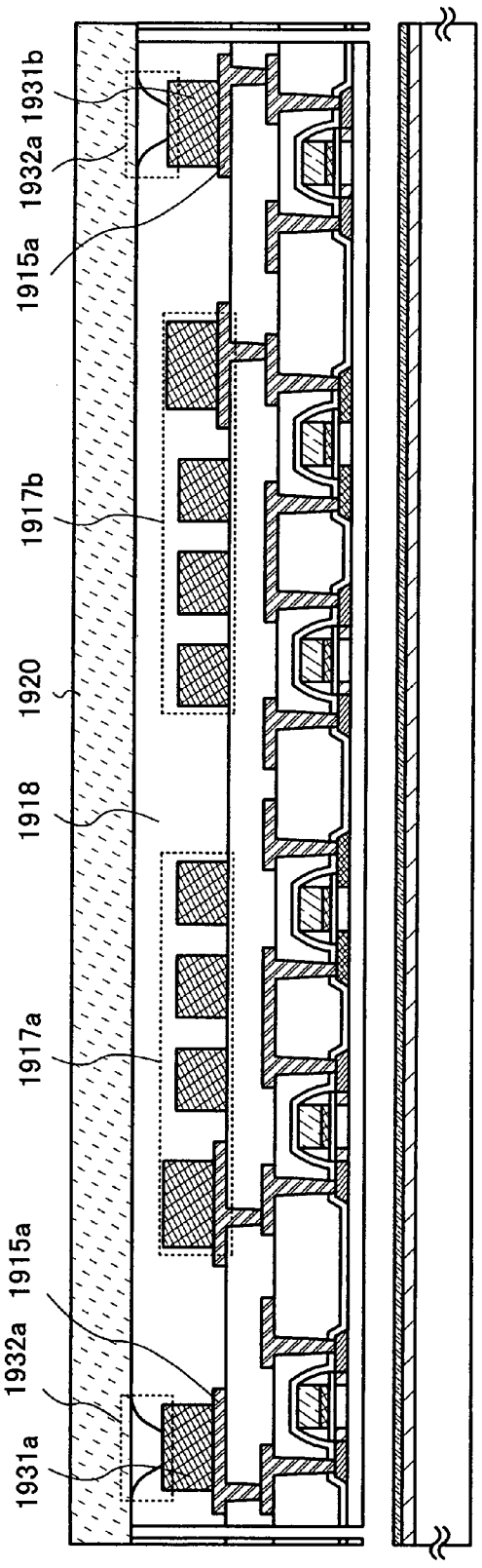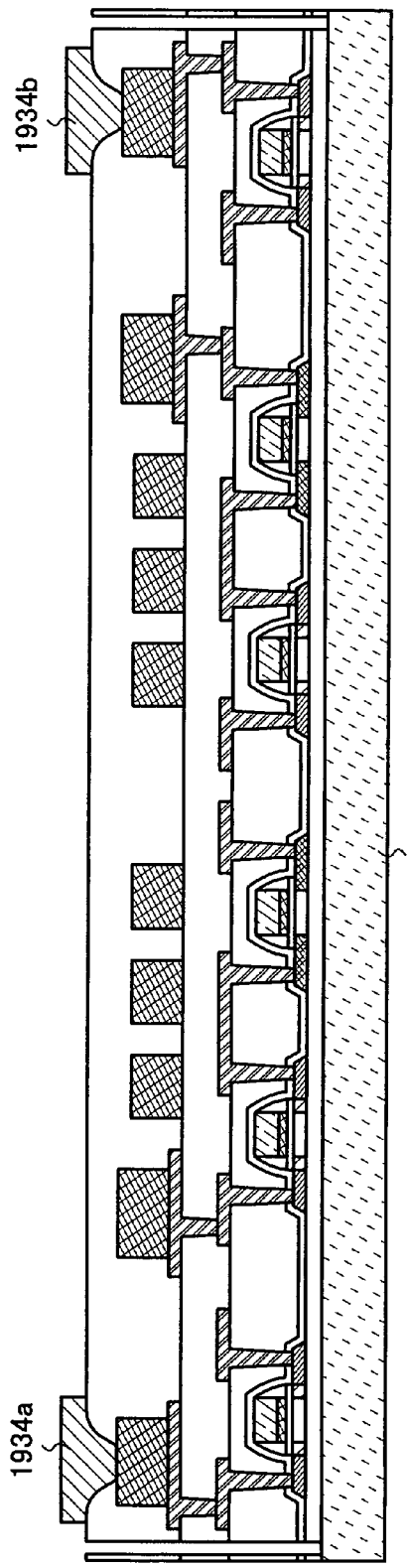

WIRELESS COMMUNICATION DEVICE

BACKGROUND OF THE INVENTION

1. Field of the Invention

The present invention relates to a wireless communication device. In particular, the present invention relates to a wireless communication device that transmits and receives data and receives electric power through an electric wave.

2. Description of the Related Art

In recent years, various electric appliances have become widely used and wide varieties of appliances have appeared on the market. In particular, the spread of portable wireless communication devices has been remarkable. As an example, cellular phones, portable televisions, and the like have become very convenient, which is contributed by the improvement in definition of display portions and durability of batteries and by the reduction of power consumption of the wireless communication devices. The portable wireless communication device has a structure in which a rechargeable battery is built-in to secure electric power. As a battery, a secondary battery (hereinafter referred to as a 'battery') such as a lithium ion battery is generally used. However, it is necessary for the battery to be charged from an AC adaptor which is plugged into a household alternating current power supply (for example, see Patent Document 1: Japanese Published Patent Application No. 2005-150022).

In recent years, an individual identification technique utilizing wireless communication using an electromagnetic field, an electric wave, or the like has attracted attention as an application of a wireless communication device. In particular, an individual identification technique with the utilization of an RFID (Radio Frequency IDentification) tag, which communicates data by wireless communication, has attracted attention as an example of the wireless communication device. The RFID tag is also referred to as an IC (Integrated Circuit) tag, an IC chip, an RF tag, a wireless tag, or an electronic tag. The individual identification technique with the utilization of an RFID tag has been useful for production, management, and the like of an individual object and application thereof to personal authentication has been expected.

An RFID tag can be classified into two types depending on whether a power source is built into the RFID tag or electric power is supplied from the outside: an active-type RFID tag capable of transmitting electric waves or electromagnetic waves including information on the RFID tag, and a passive-type RFID tag which is driven by conversion of electric waves or electromagnetic waves (carrier waves) from outside to power (as for the active-type RFID tag, see Patent Document 2: Japanese Published Patent Application No. 2005-316724 and, as for the passive-type RFID tag, see Patent Document 3: Japanese Translation of PCT International Application No. 2006-503376). The active-type RFID tag has a structure in which a power supply for driving the RFID tag is built-in and a battery is provided as the power supply. In addition, the passive-type RFID tag has a structure in which power of electric waves or electromagnetic waves (carrier waves) from the outside is utilized as power for driving the RFID tag and a structure without a battery is realized.

SUMMARY OF THE INVENTION

However, the frequency of usage of movable electronic devices such as cellular phones and portable televisions has increased steadily, and thus, it is required to improve the durability of batteries and to reduce the power consumption of electric devices. However, there is a limit to such improvement to deal with the prolonged operating time. Further, for charging batteries which are built into cellular phones, portable televisions, and the like, there is no efficient methods other than charging from a household alternating current power supply through an AC adaptor or from a commercially available primary battery. Therefore, charging has been troublesome for users, and it has been necessary for users to bring with an AC adaptor or a primary battery itself when such electric devices are used outdoors for a long time.

In the case of the active-type RFID tag provided with a battery for driving, the communication distance can be extended compared with the passive-type RFID tag. However, there has been a problem in that power failure of the battery cannot be avoided, although the consumption rate of the electric power of the batteries depends on the magnitude of the electric waves necessary for transmission and reception of signals. Therefore, the use of such RFID tag eventually results in power failure, which inhibit further transmitting and receiving individual information. Accordingly, there has been a problem in that confirmation of remaining capacity of a battery and replacement of batteries are necessary in order to continuously use the active-type RFID tag provided with a battery for driving.

Thus, it is an object of the present invention to facilitate charge of a battery in such a wireless communication device. In addition, it is another object of the present invention to provide a wireless communication device capable of transmitting and receiving individual information without battery replacement that is required due to power exhaustion of a battery.

In order to solve the above problems, the present invention provides an RF battery (a wireless battery) as a power source for supplying electric power to a circuit included in a wireless communication device. In addition, in the present invention, an antenna circuit for charging the RF battery by wireless is provided as a means which supplies power to the RF battery. Moreover, in the present invention, a wireless communication device is provided with a plurality of RF batteries. Hereinafter, a specific structure of the present invention will be described.

In accordance with one feature of the present invention, a wireless communication device includes an antenna circuit and a plurality of batteries electrically connected to the antenna circuit through a switch, where the plurality of batteries are each electrically connected to a different circuit, and the antenna circuit receives an electric wave so that the plurality of batteries are charged.

In accordance with another feature of the present invention, a wireless communication device includes a plurality of antenna circuits and a plurality of batteries electrically connected to any one of the plurality of antenna circuit through a switch, where the plurality of batteries are each electrically connected to a different circuit, the antenna circuit which is electrically connected to the battery through the switch receives electric waves so that the plurality of batteries are charged, and at least one of the plurality of antenna circuits receives an electric wave having a different frequency.

In accordance with another feature of the present invention, a wireless communication device includes a plurality of antenna circuits, a plurality of batteries electrically connected to any one of the plurality of antenna circuits through a switch, and a communication control circuit electrically connected to at least any one of the plurality of antenna circuits, where the plurality of batteries are each electrically connected to a different circuit, the communication control circuit transmits data outside through the plurality of antenna circuits, the antenna circuit which is electrically connected to the plurality of batteries through the switch receives electric waves so that the plurality of batteries are charged, and at least one of the plurality of antenna circuits receives an electric wave having a different frequency.

In accordance with another feature of the present invention, a wireless communication device includes a first antenna circuit and a second antenna circuit, a first battery electrically connected to the first antenna circuit through a first switch, and a second battery electrically connected to the second antenna circuit through a second switch, where the first antenna circuit receives an electric wave so that the first battery is charged, the second antenna circuit receives an electric wave so that the second battery is charged, the first battery and the second battery are each connected to a different circuit, and the first antenna circuit and the second antenna circuit each receive an electric wave having a different frequency.

In accordance with another feature of the present invention, a wireless communication device includes a first antenna circuit, a second antenna circuit, a third antenna circuit, a first battery electrically connected to the first antenna circuit through a first switch and electrically connected to the second antenna circuit through a second switch, and a second battery electrically connected to the third antenna circuit through a third switch, where the first antenna circuit or the second antenna circuit receives an electric wave so that the first battery is charged, the third antenna circuit receives an electric wave so that the second battery is charged, the first battery and the second battery are each connected to a different circuit, and the first antenna circuit and the second antenna circuit each receive an electric wave having a different frequency.

In accordance with another feature of the present invention, a wireless communication device includes a first antenna circuit and a second antenna circuit, a signal processing circuit electrically connected to the first antenna circuit and the second antenna circuit, a first battery which is charged by reception of an electric wave by the first antenna circuit, and a second battery which is charged by reception of an electric wave by the second antenna circuit, where the first antenna circuit transmits and receives a signal for transmitting data stored in the signal processing circuit outside, the first battery and the second battery each supply power to a different circuit provided in the signal processing circuit, and the first antenna circuit and the second antenna circuit each receive an electric wave having a different frequency.

In addition, in the above structures, a power storage means may be included as the battery, and a lithium battery having a sheet shape, preferably, a lithium polymer battery using gelled electrolyte, a lithium ion battery, or the like can be used. In addition, a battery capable of being charged and discharged such as a nickel-metal-hydride battery or a nickel-cadmium battery may be used. Alternatively, instead of the battery, a capacitor or the like such as an electric double layer capacitor, a ceramic capacitor, or a multilayer ceramic capacitor can also be used.

Note that wireless communication devices in this specification refer to all devices which can function by transmission and reception of electric waves by wireless.

In the present invention, a wireless communication device is provided with a battery capable of being charged by wireless, so that the charge of the battery provided in the wireless communication device can be facilitated, and a wireless communication device permanently capable of transmitting and receiving information to and from outside without replacement of batteries can be obtained. In addition, the wireless communication device is provided with a plurality of batteries, so that a halt of the system of the wireless communication device can be avoided. Moreover, a plurality of batteries are each provided in a circuit having different power consumption, so that suppress of excess power consumption and power saving of a wireless communication device can be realized.

BRIEF DESCRIPTION OF DRAWINGS

In the accompanying drawings:

FIGS. 22A and 22B illustrate one example of a manufacturing method of a wireless communication device of the present invention.

DETAILED DESCRIPTION OF THE INVENTION

Figure 1:
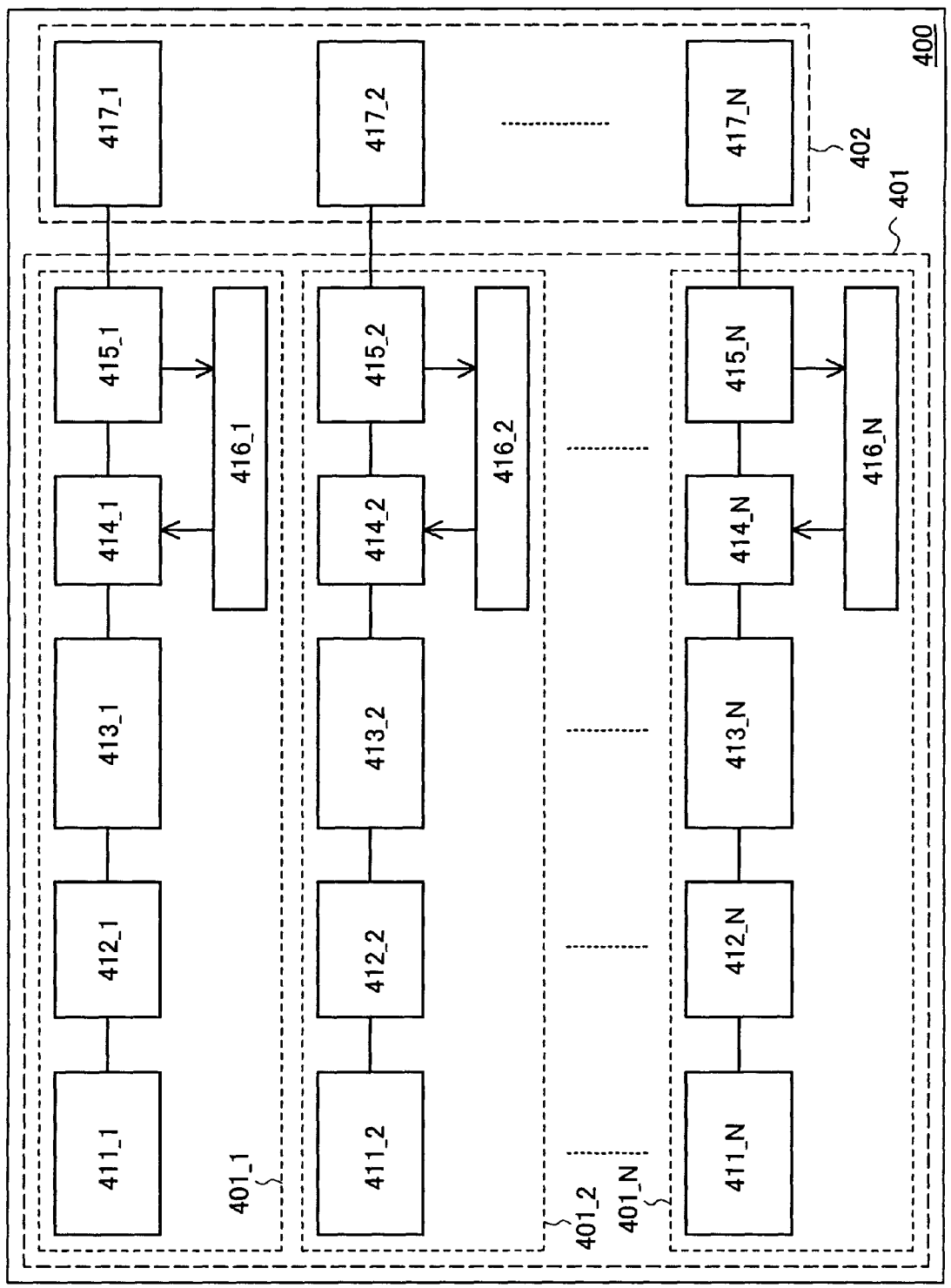
FIG. 1 illustrates one structural example of a wireless communication device of the present invention.

Embodiment modes of the present invention will be described hereinafter with reference to the accompanying drawings. However, it is to be easily understood that various changes and modifications in modes and details thereof will be apparent to those skilled in the art without departing from the purpose and the scope of the present invention. Therefore, the present invention should not be interpreted as being limited to the description of the embodiment modes. Note that, in the following structures of the present invention to be described, reference numerals denoting the same portions are used in common among different drawings.

Embodiment Mode 1

In this embodiment mode, an example of a wireless communication device including a power receiving device portion will be described with reference to drawings.

A wireless communication device 400 described in this embodiment mode has a power receiving device portion 401 and a power supply load portion 402 (see FIG. 1).

The power receiving device portion 401 has a plurality of RF battery portions each including an antenna circuit, a rectifier circuit, a voltage control circuit, a switch, a charge control circuit, and a battery. FIG. 1 illustrates a structure in which the power receiving device portion 401 is provided with N(N≧3 in FIG. 1) RF battery portions. A first RF battery portion 401_1 includes a first antenna circuit 411_1, a first rectifier circuit 412_1, a first voltage control circuit 413_1, a first switch 414_1, a first charge control circuit 416_1, and a first battery 415_1.

Similarly, a second RF battery portion 401_2 includes a second antenna circuit 411_2, a second rectifier circuit 412_2, a second voltage control circuit 413_2, a second switch 414_2, a second charge control circuit 416_2, and a second battery 415_2. An N-th RF battery portion 401_N includes an N-th antenna circuit 411_N, an N-th rectifier circuit 412_N, an N-th voltage control circuit 413_N, an N-th switch 414_N, an N-th charge control circuit 416_N, and an N-th battery 415_N.

The power supply load portion 402 is provided with a plurality of circuits for forming the wireless communication device. Here, an example is shown in which a first circuit 417_1 is supplied with electric power from the first battery 415_1, a second circuit 417_2 is supplied with electric power from the second battery 415_2, and an N-th circuit 417_N is supplied with power from the N-th battery 415_N.

In addition, it is also possible to use the battery provided in the RF battery portion when power is necessary for operation of the RF battery portion. Note that the circuits 417_1 to 417_N each realize a specific function such as a memory circuit, a memory control circuit, a logic circuit, a pixel portion, a display control portion, or an integrated circuit portion, and the circuit configuration depends on the function of the wireless communication devices 400.

Figure 3A:
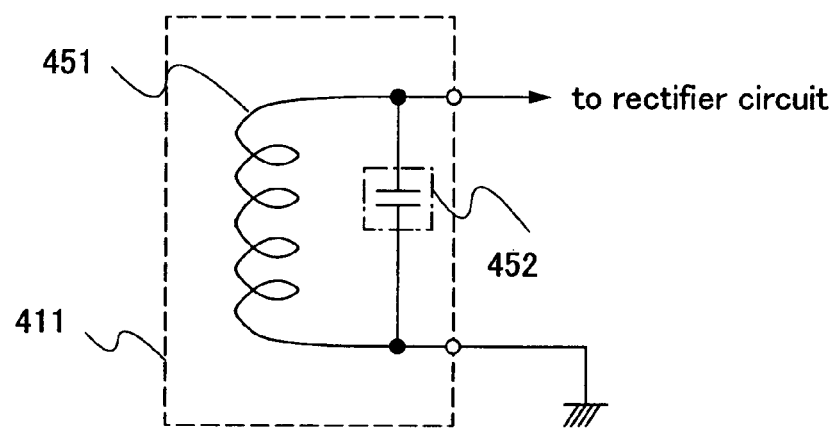
FIGS. 3A and 3B each illustrate one structural example of a wireless communication device of the present invention.

Moreover, each of the first antenna circuit 411_1 to the N-th antenna circuit 411_N can be constructed by an antenna 451 and a resonant capacitor 452. In this specification, the antenna 451 and the resonant capacitor 452 are collectively referred to as an antenna circuit 411 (see FIG. 3A).

Figure 3B:
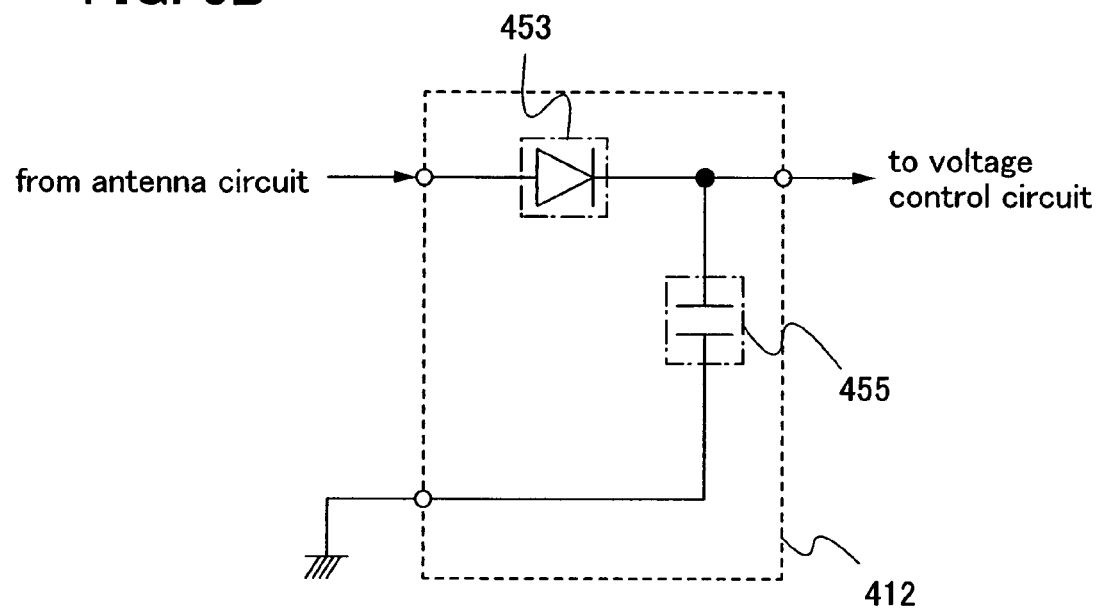

Each of the first rectifier circuit 412_1 to the N-th rectifier circuit 412_N may be a circuit that converts an alternating current signal, which is induced by an electric wave received by the antenna, into a direct current signal. The rectifier circuit is mainly formed of a diode and a smoothing capacitor. A resistor or a capacitor may also be included in order to adjust impedance. For example, as illustrated in FIG. 3B, a rectifier circuit 412 may be formed of a diode 453 and a smoothing capacitor 455.

The first voltage control circuit 413_1 to the N-th voltage control circuit 413_N each may be a circuit (a constant voltage circuit) which maintains direct current voltage outputted from the rectifier circuit at a definite value. When the battery is charged at constant current, a circuit (a constant current source) which maintains direct current at a definite value may be used instead of the voltage control circuit.

The first switch 414_1 to the N-th 414_N and the first charge control circuit 416_1 to the N-th charge control circuit 416_N are provided to control the charge and discharge in charging the respective batteries. The charge and discharge of the batteries are controlled, so that the overcharge of the batteries is prevented and the batteries can be utilized efficiently.

Here, the first charge control circuit 416_1 to the N-th charge control circuit 416_N are connected to the first battery 415_1 to the N-th battery 415_N, respectively, to monitor the charge conditions of the batteries and to control on or off of the first switch 414_1 to the N-th switch 414_N depending on the charge condition. On or off of the first switch 414_1 to the N-th switch 414_N are controlled, so that the overcharge of the first battery 415_1 to the N-th battery 415_N can be prevented.

In addition, a switch (not shown) may also be provided between the first battery 415_1 and the first circuit 417_1. The charge condition of the first battery 415_1 may be monitored by the first charge control circuit 416_1 to control on/off of this switch depending on the charge condition. Provision of the switch between the first battery 415_1 and the first circuit 417_1 allows suppression of the overdischarge of the first battery 415_1. Furthermore, a switch may be provided between the second battery 415_2 and the second circuit 417_2 or between the N-th battery 415_N and the N-th circuit 417_N.

Moreover, the first battery 415_1 to the N-th battery 415_N may be any battery as long as electric power can be recovered by being charged. For example, the use of lithium battery having a sheet shape, preferably, a lithium polymer battery using gelled electrolyte, a lithium ion battery, or the like allows the miniaturization of the wireless communication device. Any kinds of batteries capable of being charged and discharged such as a nickel-metal-hydride battery or a nickel-cadmium battery may be used as long as the battery can be charged. Alternatively, a structure may also be employed in which, instead of the battery, a capacitor or the like such as an electric double layer capacitor, a ceramic capacitor, or a multilayer ceramic capacitor is used.

In this specification, a battery refers to one in which electric energy, which is externally obtained, is transformed into chemical energy to be stored and, if necessary, extracted again as electromotive force. A capacitor refers to one in which a large quantity of electric charges are accumulated in a conductor. When two insulated conductors come close to have positive and negative electric charges, the electric charges are accumulated, which originates from the Coulomb force between the positive and negative electric charges.

Note that, when a plurality of batteries are provided in a telecommunication device, different kinds of batteries or capacitors may be combined. For example, the plurality of batteries can be provided by combination of a ceramic capacitor and an electric double layer capacitor.

In a case where each of the plurality of batteries is connected to a different circuit to supply electric power, each of the batteries is provided in a circuit having different power consumption, so that excess power consumption can be suppressed and power consumption can be reduced. For example, when only one battery is provided to a wireless communication device having a circuit that needs 10 V and a circuit that needs only 3 V, surplus power is also supplied to the circuit that needs only 3 V, which results in increase in power consumption. However, the batteries are each provided in the circuit having different power consumption, so that electric power can be efficiently supplied to the plurality of circuits and power consumption of the wireless communication device can be reduced.

Note that the plurality of batteries are each provided by being electrically connected to a circuit having a different function in FIG. 1; however, the plurality of batteries may be connected to one circuit to supply power. In this case, a structure may be employed in which an antenna circuit electrically connected to each of the plurality of batteries receives an electric wave having a different frequency, which allows electric waves having a plurality frequencies to be utilized in charging the batteries.

Figure 2:
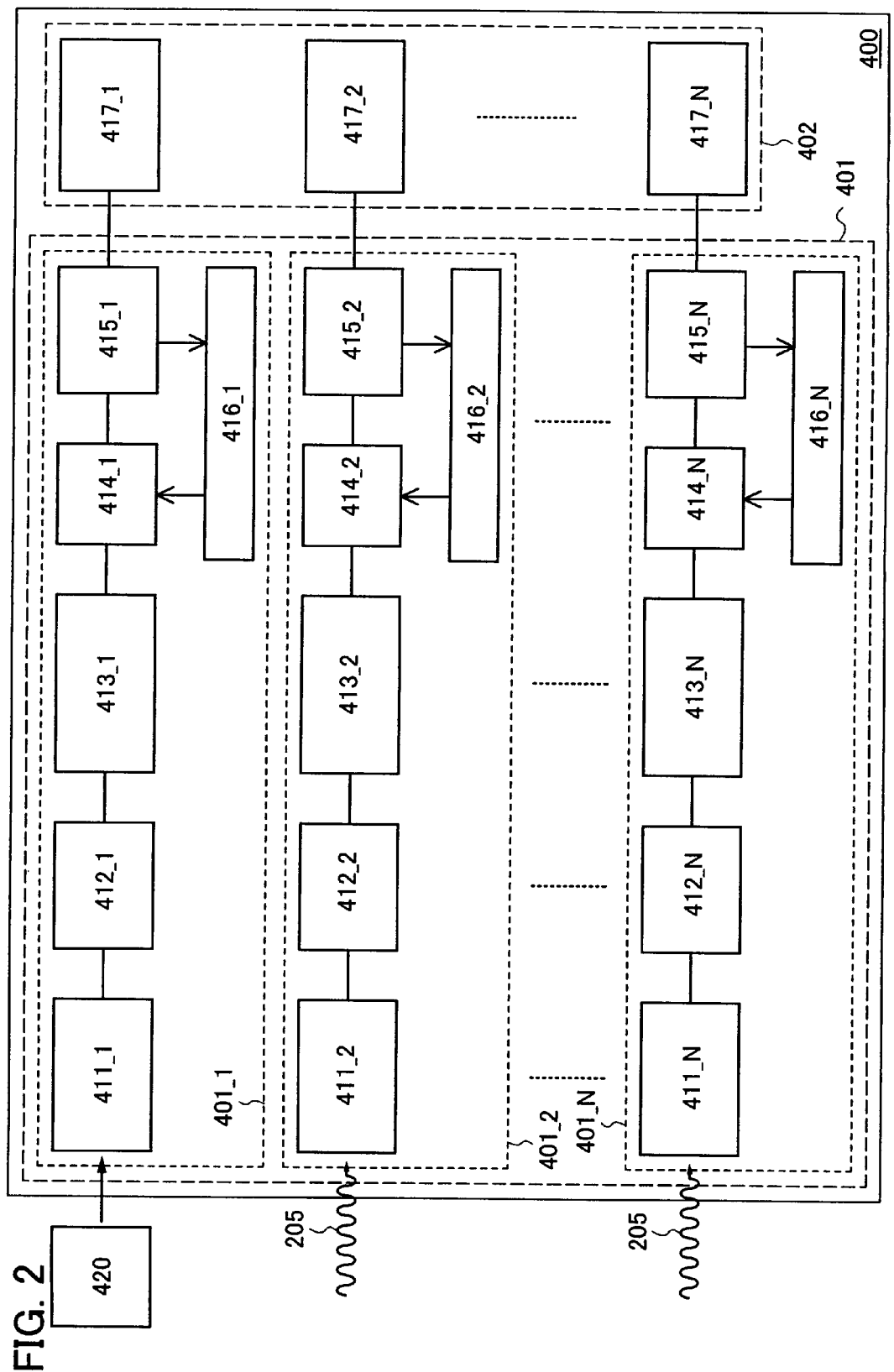
FIG. 2 illustrates one structural example of a wireless communication device of the present invention.

Next, FIG. 2 illustrates a case where the first antenna circuit 411_1 to the N-th antenna circuit 411_N, which are provided in the power receiving device portion 401, receive electric waves to charge the first battery 415_1 to the N-th battery 415_N.

The first battery 415_1 to the N-th battery 415_N provided in the power receiving device portion 401, which are described in this embodiment mode, are charged by reception of electric waves by the first antenna circuit 411_1 to the N-th antenna circuit 411_N. That is, the batteries are charged by wireless in this structure.

As electric waves received by the first antenna circuit 411_1 to the N-th antenna circuit 411_N, electric waves transmitted from a power feeder or electric waves that are randomly generated outside may be utilized. The power feeder may be any device as long as electric waves having specific wavelengths are transmitted, and it is preferable to transmit electric waves having wavelengths that can be easily received by the antennas provided in the antenna circuits. As the electric waves that are randomly generated outside, for example, electric waves of switching offices of cellular phones (800 to 900 MHz band, 1.5 GHz band, 1.9 to 2.1 GHz band, or the like); electric waves generated from cellular phones; electric waves of an electric wave clock (40 kHz or the like); noises of a home AC power supply (60 Hz or the like); or the like can be utilized.

In addition, an antenna circuit that utilizes the electric waves from a power feeder and an antenna circuit that utilizes the electric waves that are randomly generated outside may be combined in charging the batteries. Here, an example is shown in which the first antenna circuit 411_1 receives an electric wave transmitted from a power feeder 420 to charge the first battery 415_1, and the second antenna circuit 411_2 to the N-th antenna circuit 411_N receive electric waves 205 that are randomly generated outside to charge the second battery 415_2 to the N-th battery 415_N.

When the plurality of antenna circuits are provided to charge the plurality of batteries, a structure may be employed in which the plurality of antenna circuits receive electric waves having the same frequency; however, a structure is preferably employed in which at least one of the plurality of antenna circuits receives electric waves having a frequency different from those of other antenna circuits. This is because, when the plurality of antenna circuits receive electric waves having the same frequency, charge efficiency decreases as the number of antenna circuits increases.

When the battery is charged by wireless using the power feeder 420, the battery can be charged stably. In the plurality of antenna circuits, the antennas provided in the antenna circuits may be formed in the same shape, whereby the plurality of antenna circuits receive electric waves transmitted from one power feeder to charge the plurality of batteries.

Figure 4:
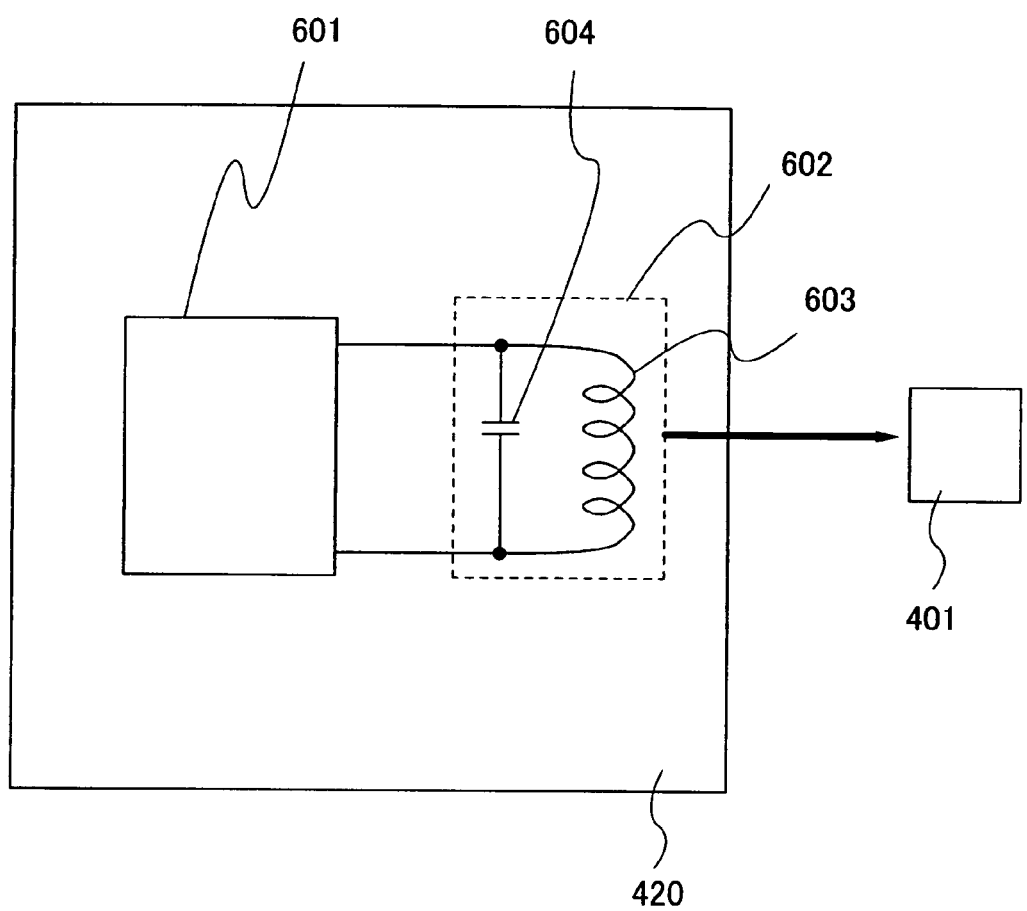
FIG. 4 illustrates one structural example of a power feeder that transmits electric waves to a wireless communication device of the present invention.

In addition, the power feeder 420 in FIG. 2 can be constituted of a power-transmission control portion 601 and an antenna circuit 602 (see FIG. 4). The power-transmission control portion 601 modulates an electrical signal for power transmission that is transmitted to the power receiving device portion 401 in the wireless communication device 400 and outputs an electromagnetic wave for power transmission from the antenna circuit 602.

In this embodiment mode, the antenna circuit 602 of a power feeder 600 illustrated in FIG. 4, which is connected to the power-transmission control portion 601, has an antenna 603 and a resonant capacitor 604 that constitute an LC parallel-resonant circuit. When power is transmitted, the power-transmission control portion 601 supplies induction current to the antenna circuit 602, and an electromagnetic wave for power transmission is outputted to the power receiving device portion 401 from the antenna 603.

Note that a frequency of a signal transmitted from the power feeder 420 can be, for example, any one of 300 GHz to 3 THz, which is a submillimeter wave, 30 to 300 GHz, which is a millimeter wave, 3 to 30 GHz, which is a microwave, 300 MHz to 3 GHz, which is an ultrahigh frequency wave, 30 to 300 MHz, which is a very high frequency wave, 3 to 30 MHz, which is a high frequency wave, 300 KHz to 3 MHz, which is a medium frequency wave, 30 to 300 KHz, which is a low frequency wave, or 3 to 30 KHz, which is a very low frequency wave.

On the other hand, when the electric waves that are randomly generated outside are received to charge the batteries by wireless, the power feeder or the like for charging the batteries is not necessarily added; therefore, low cost and improvement in portability can be achieved. In addition, when the electric waves that are randomly generated outside are received to charge the plurality of batteries, the antennas provided in the antenna circuits have shapes which facilitate receiving these electric waves that are randomly generated outside. Note that, a structure may be employed in which antennas having the same shapes are provided to receive electric waves having the same frequencies in the plurality of antenna circuits. Alternatively, a structure may be employed in which antennas having different shapes are provided to receive electric waves having different frequencies. For example, a structure in which the shapes of the antenna in the first antenna circuit 411_1 to the N-th antenna circuit 411_N are all different or a structure in which a plurality of antennas (for example, m ($2 \leq 5\ m \leq N$) antennas) have the same shapes may be employed.

Figure 12:
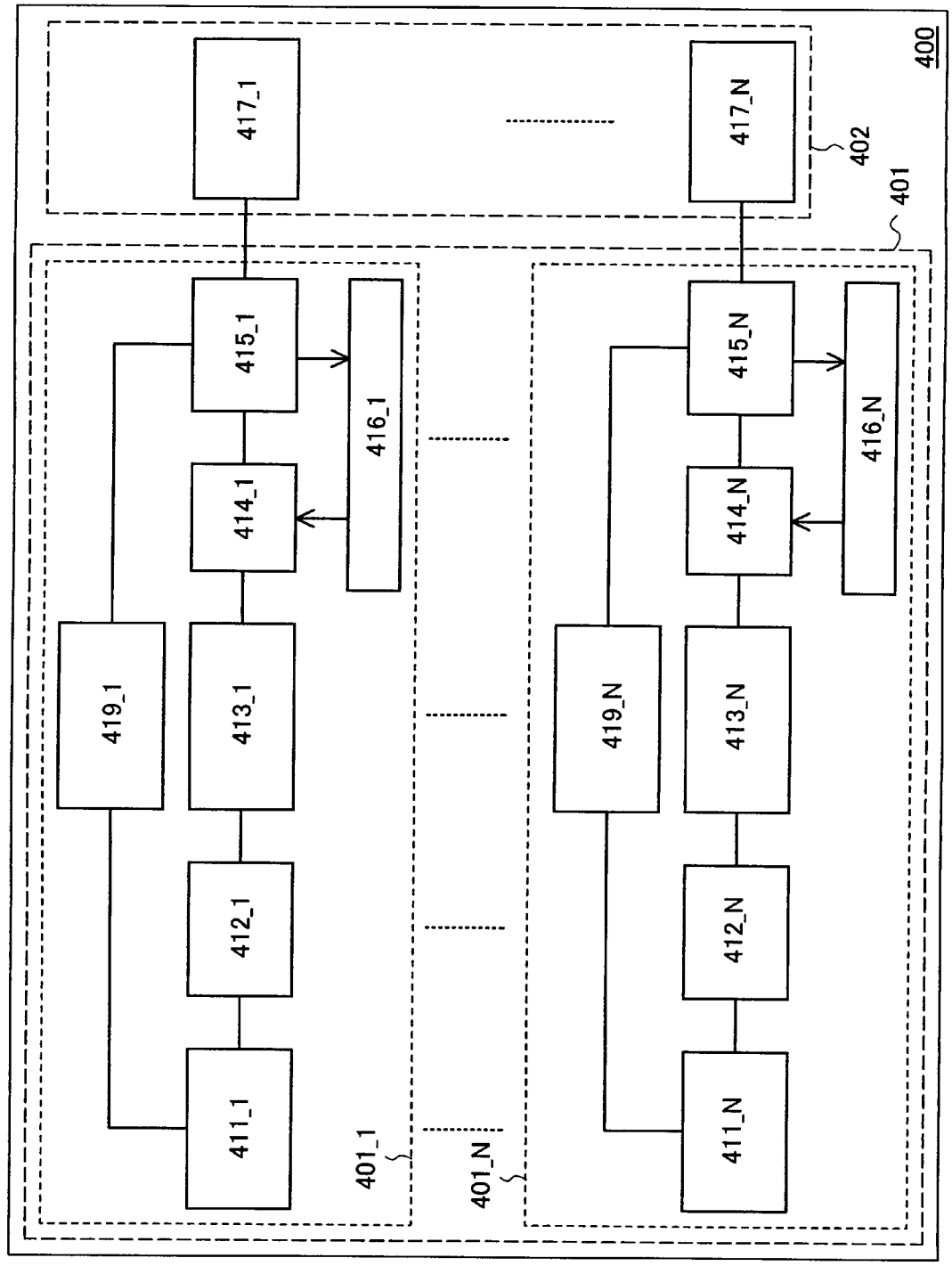
FIG. 12 illustrates one structural example of a wireless communication device of the present invention.

In addition, the wireless communication device 400 illustrated in FIGS. 1 and 2 may be provided with a communication control circuit that enables transmission and reception of information to and from outside (FIG. 12). Here, a first communication control circuit 419_1 is connected to the first antenna circuit 411_1, and information can be transmitted and received to and from outside through the first antenna circuit 411_1. Moreover, the first communication control circuit 419_1 and the first battery 415_1 are electrically connected, so that power can be supplied to the first communication control circuit 419_1 from the first battery 415_1.

The first communication control circuit 419_1 may be provided with a circuit that enables transmission and reception of information to and from outside. For example, the first communication control circuit 419_1 can be constituted of a demodulation circuit, a modulation circuit, a logic circuit, a memory circuit, and the like. Note that the first to N-th communication control circuits, the first to N-th rectifier circuits, the first to N-th voltage control circuits, the first to N-th switches, and the first to N-th charge control circuits may be collectively referred to as a signal processing circuit in some cases. It is noted that the communication control circuits may be each provided in the antenna circuit and, here, an example is shown in which the N-th communication control circuit 419_N is provided so as to be electrically connected to the N-th antenna circuit 411_N.

Figure 5A:
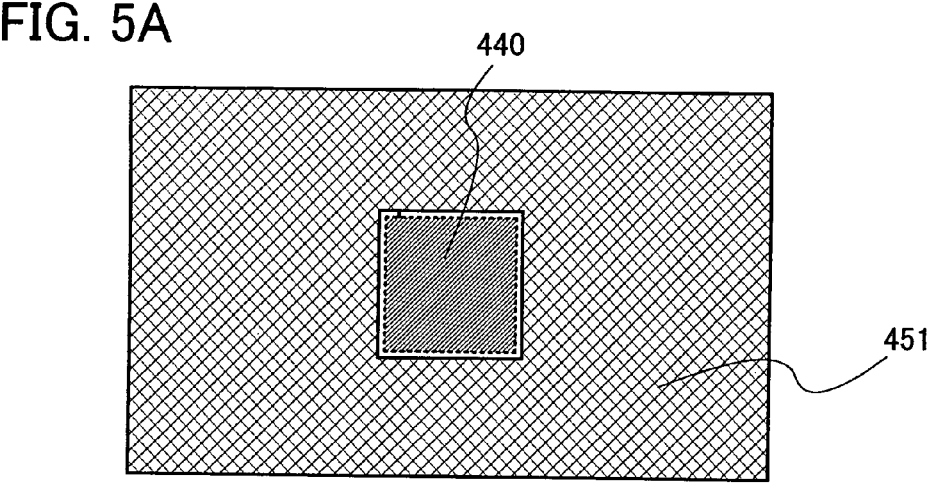
FIGS. 5A to 5E each illustrate one structural example of a wireless communication device of the present invention.
Figure 5B:
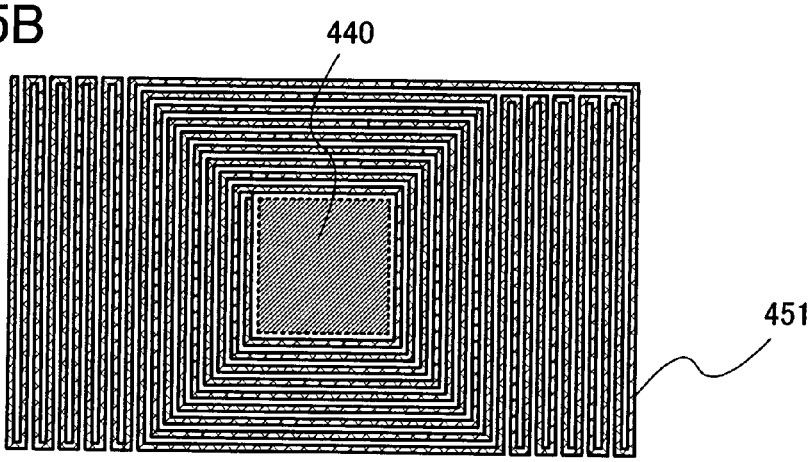
Figure 5C:
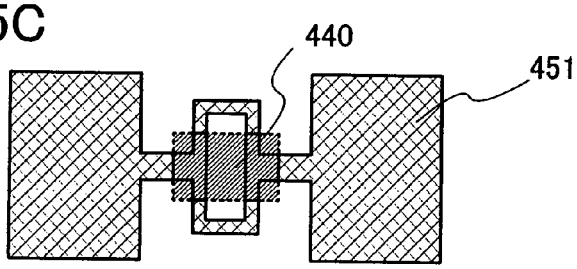
Figure 5D:
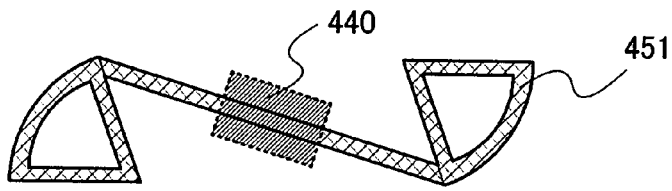
Figure 5E:
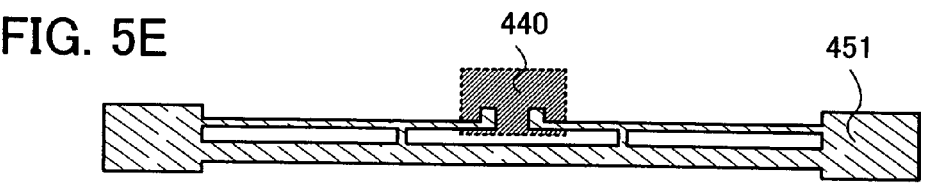

The shapes of the antennas 451 in the first antenna circuit 411_1 to the N-th antenna circuit 411_N are not particularly limited. For example, a structure illustrated in FIG. 5A may be employed in which an antenna 451 is disposed all around a chip 440 provided with a circuit. Alternatively, a structure illustrated in FIG. 5B may be employed in which a chip 440 provided with a circuit is surrounded with a thin antenna 451. In addition, a layout illustrated in FIG. 5C may be employed in which a chip 440 provided with a circuit is disposed, and an antenna 451 has a form suited to receiving high-frequency electromagnetic waves. Moreover, a layout illustrated in FIG. 5D may be employed in which a chip 440 provided with a circuit is disposed, and an antenna 451 which is 180-degree omnidirectional (such that it can receive signals in any direction) is disposed. Further, a layout illustrated in FIG. 5E may be employed in which a chip 440 provided with a circuit is disposed, and an antenna 451 has a long rod shape and is folded back on itself.

In addition, the antennas 451 may be patch antennas. Note that the connections of the circuits 417 and the antennas 451 in the antenna circuits 411 are not particularly limited to the structures illustrated in FIGS. 5A to 5E. For example, the antenna circuits 411 and the circuits 417 may be disposed in separate positions and connected by wirings, or may be connected by being disposed close to each other. Since appropriate lengths of the antennas 451 vary depending on frequencies of electric waves that is utilized, the lengths of the antennas 451 are preferably set depending on electric waves that is utilized.

The plurality of batteries capable of being charged by wireless are thus each provided in the circuit, so that a halt of the system of the wireless communication device due to exhaustion of one of batteries can be prevented. In addition, the plurality of batteries are each provided in the circuit having different power consumption, so that excess power consumption can be suppressed. For example, when a functional circuit that needs a voltage V1 and a functional circuit that needs a voltage V2 (V1>V2) are provided, the batteries are each provided in the functional circuit to supply power, so that unnecessary power supply can be suppressed and power consumption can be reduced.

Note that the wireless communication device described in this embodiment mode can be implemented in combination with structures of wireless communication devices that will be described in other embodiment modes in this specification.

Embodiment Mode 2

In this embodiment mode, a structure of a wireless communication device (for example, a cellular phone, a digital video camera, or the like) having a display means will be described as an example of the wireless communication device described in the above embodiment mode with reference to drawings.

Figure 6:
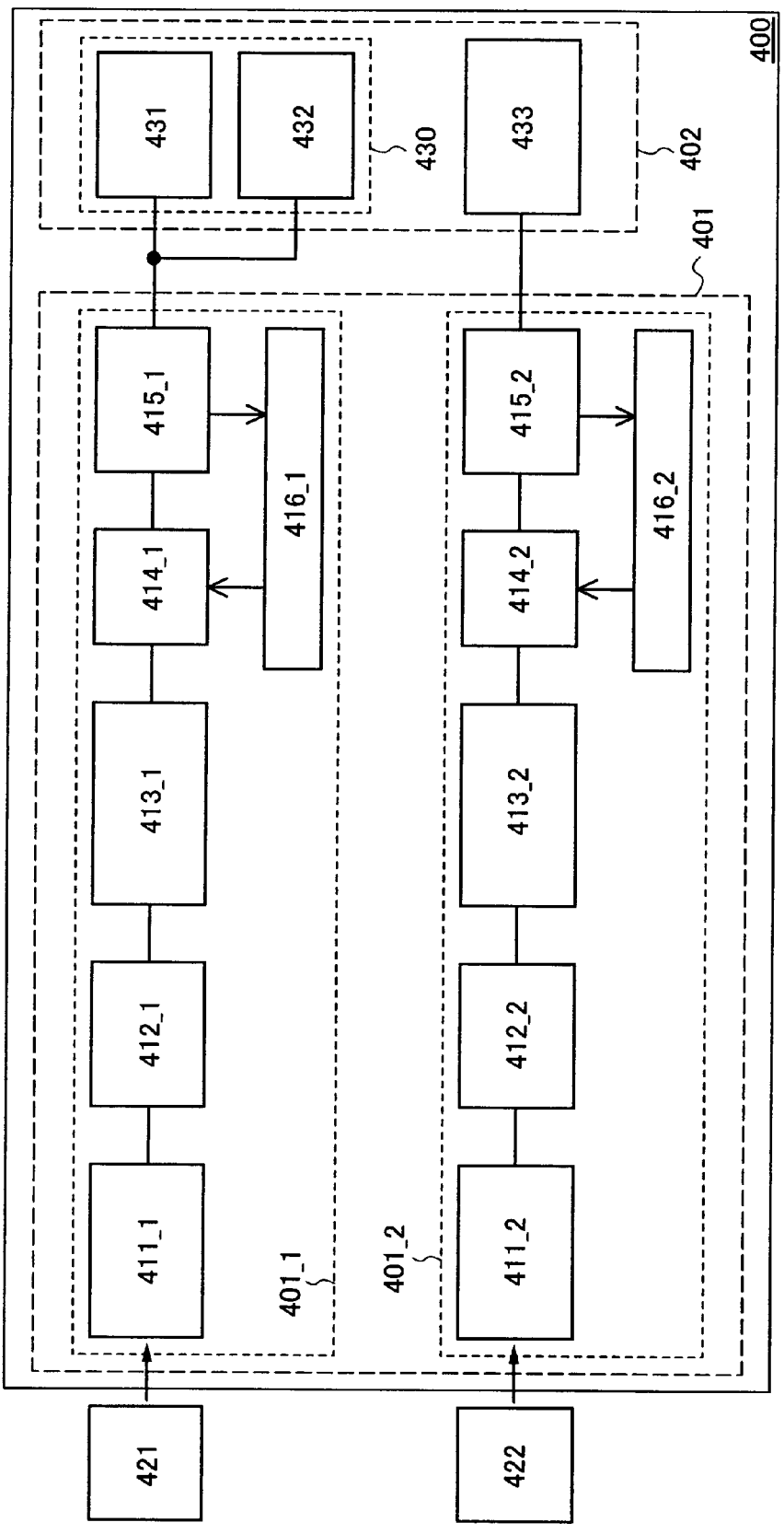
FIG. 6 illustrates one structural example of a wireless communication device of the present invention.

The wireless communication device 400 described in this embodiment mode has the power receiving device portion 401 including the first RF battery portion 401_1 and the second RF battery portion 401_2, and the power supply load portion 402 including a display portion 430 provided with a pixel portion 431 and a display control portion 432 and including an integrated circuit portion 433 (see FIG. 6). The integrated circuit portion 433 is a circuit that processes signals other than those in the display portion 430. The display portion 430 is provided with the pixel portion 431 and the display control portion 432 for controlling the pixel portion 431. Note that kinds of a display element provided in the pixel portion 431 of the display portion 430 are not limited, and an electroluminescence element, a liquid crystal element, or the like can be applied.

Figure 13:
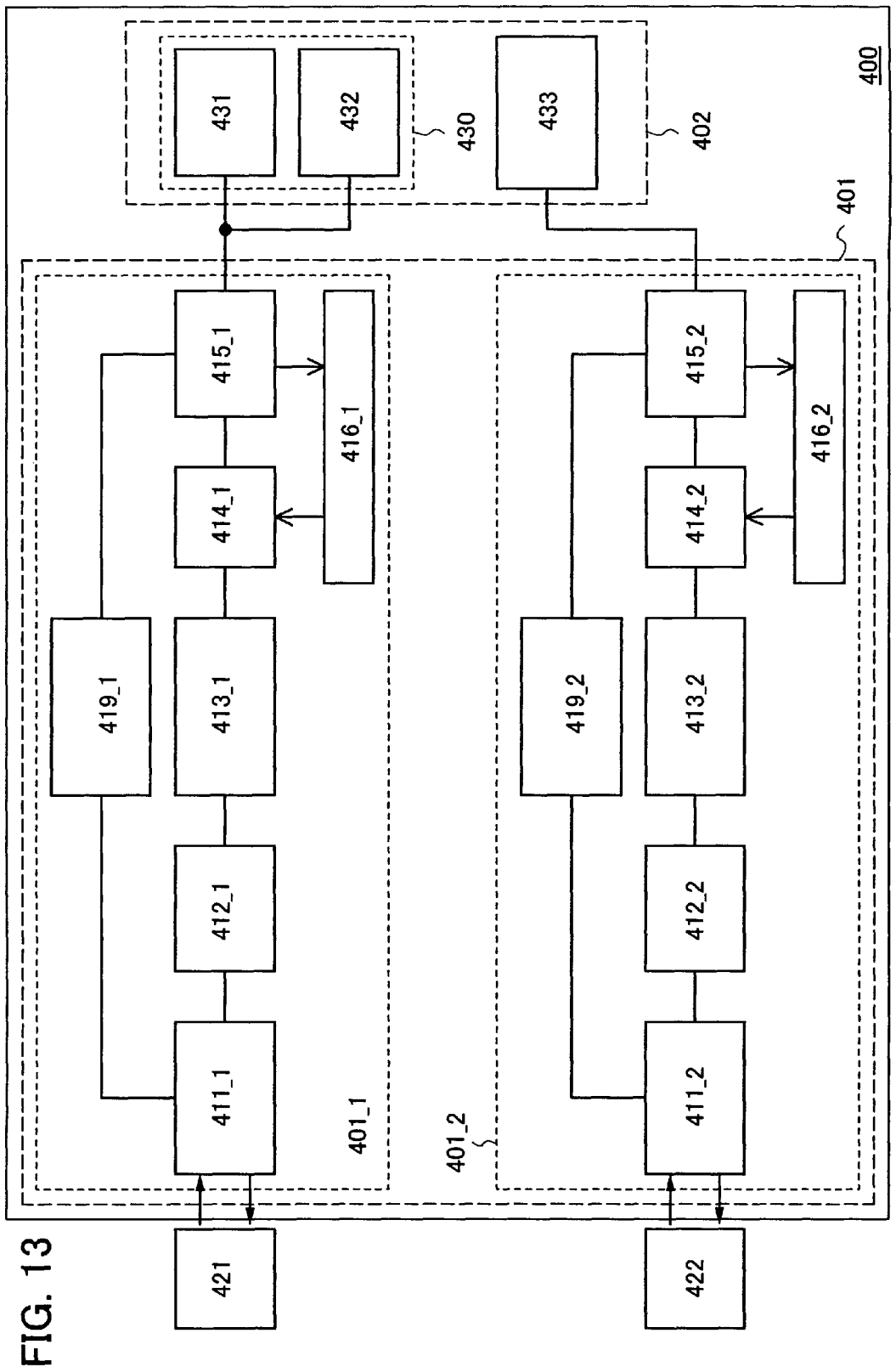
FIG. 13 illustrates one structural example of a wireless communication device of the present invention.

In a case of transmitting and receiving information to and from outside, a structure may be employed in which the communication control circuit is provided as illustrated in FIG. 12. For example, a first communication control circuit 419_1 and a second communication control circuit 419_2 may be provided so as to electrically connect to the first antenna circuit 411_1 and the second antenna circuit 411_2, respectively (see FIG. 13). In order to supply electric power supplies to the first communication control circuit 419_1 and the second communication control circuit 419_2, the first battery 415_1 and the second battery 415_2 can be utilized, respectively. As the first battery 415_1 and the second battery 415_2, any of the batteries and the capacitors described in the above embodiment mode can be used.

The wireless communication device described in this embodiment mode is a case where the pixel portion 431 and the display control portion 432 are provided with power from the first battery 415_1 and the integrated circuit portion 433 is supplied with electric power from the second battery 415_2. In such a case, when one of the first battery 415_1 and the second battery 415_2 is exhausted, one of the pixel portion 431 and the display control portion 432, and the integrated circuit portion 433 cannot be operated. However, the other can be operated continuously.

Hereinafter, a case will be described in which the first battery 415_1 and the second battery 415_2 are charged using a power feeder. Here, a case will be described in which the first battery 415_1 is charged using a first power feeder 421 and the second battery 415_2 is charged using a second power feeder 422.

First, electric waves are oscillated from the first power feeder 421. When the first antenna circuit 411_1 provided in the power receiving device portion 401 receives the electric waves oscillated from the first power feeder 421, a constant voltage is generated from the first voltage control circuit 413_1 after a half-wave rectification is performed by the first rectifier circuit 412_1. Then, the first switch 414_1 is turned on and the first battery 415_1 starts to be charged.

Note that, at this time, the first switch 414_1 is controlled by the first charge control circuit 416_1. That is, the charge condition of the first battery 415_1 is monitored by the first charge control circuit 416_1, and on or off of the first switch 414_1 is controlled depending on the charge condition. For example, after the charge is started, the voltage value of the first battery is monitored by the first charge control circuit 416_1, and the first switch 414_1 is turned off to complete the charge when the voltage of the first battery 415_1 becomes greater than or equal to the constant value.

In addition, when the first communication control circuit 419_1 is provided, a signal which transmits completion of the charge is oscillated through the first antenna circuit 411_1, and the first power feeder 421 can stop transmitting electromagnetic waves after receiving this signal.

Moreover, the second battery 415_2 can be charged similarly. Note that the first antenna circuit 411_1 and the second antenna circuit 411_2 are provided so as to receive electric waves having different frequencies, so that the first battery 415_1 and the second battery 415_2 can be charged effectively.

Note that the example in which the two batteries are provided is shown in the above FIG. 6; however, a structure may be employed in which three or more batteries are provided without limitation thereto.

Figure 7:
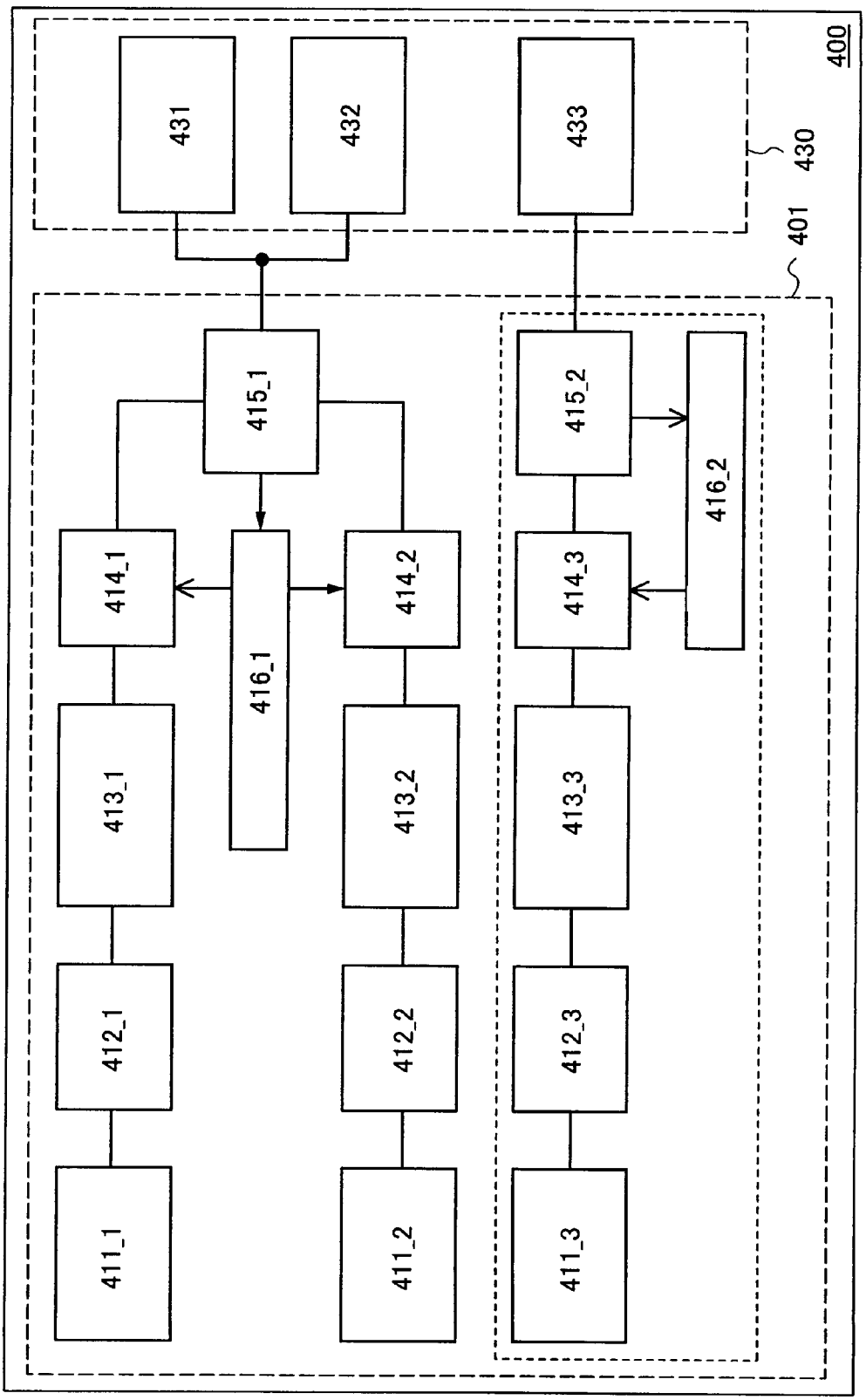
FIG. 7 illustrates one structural example of a wireless communication device of the present invention.

Further, the example is shown in which one antenna circuit, rectifier circuit, voltage control circuit, switch, and charge control circuit are provided in one battery; however, the present invention is not limited thereto. For example, as illustrated in FIG. 7, the first battery 415_1 may be charged using the first antenna circuit 411_1 and the second antenna circuit 411_2. In this case, the first antenna circuit 411_1 and the second antenna circuit 411_2 receive electric waves having different frequencies, so that a plurality of frequencies for charging the first battery 415_1 can be utilized; thus, the first battery 415_1 can be charged effectively.

Furthermore, one of the first antenna circuit 411_1 and the second antenna circuit 411_2 may receive electric waves from the power feeder to charge the first battery 415_1, and the other antenna circuit may receive the electric waves that are randomly generated outside to charge the first battery 415_1. In this case, the first battery 415_1 can be charged even in a case where an electric wave is not transmitted from the power feeder as well as the case where electric waves are transmitted from the power feeder.

In the wireless communication device illustrated in FIG. 7, on or off of the first switch 414_1 and the second switch 414_2 is controlled using the first charge control circuit 416_1 depending on the charge condition of the first battery 415_1. The example is shown here in which a third antenna circuit 411_3, a third rectifier circuit 412_3, a third voltage control circuit 413_3, a third switch 414_3, and the second charge control circuit 416_2 are used to charge the second battery 415_2; however, a structure may be employed in which a plurality of antenna circuits are used similarly to the first battery 415_1.

Here, the shapes of the antennas provided in the first antenna circuit 411_1 and the second antenna circuit 411_2 are tuned to readily receive two kinds of frequencies among a plurality of frequencies that are randomly generated outside, so that the first battery 415_1 can be charged effectively. In addition, the second battery 415_2, which is charged through one antenna circuit, is charged stably with electric waves oscillated from the power feeder.

Note that, in FIG. 7, the first battery 415_1 and the second battery 415_2 may be charged through the first antenna circuit 411_1 to the third antenna circuit 411_3 with preparation of three power feeders.

Figure 8:
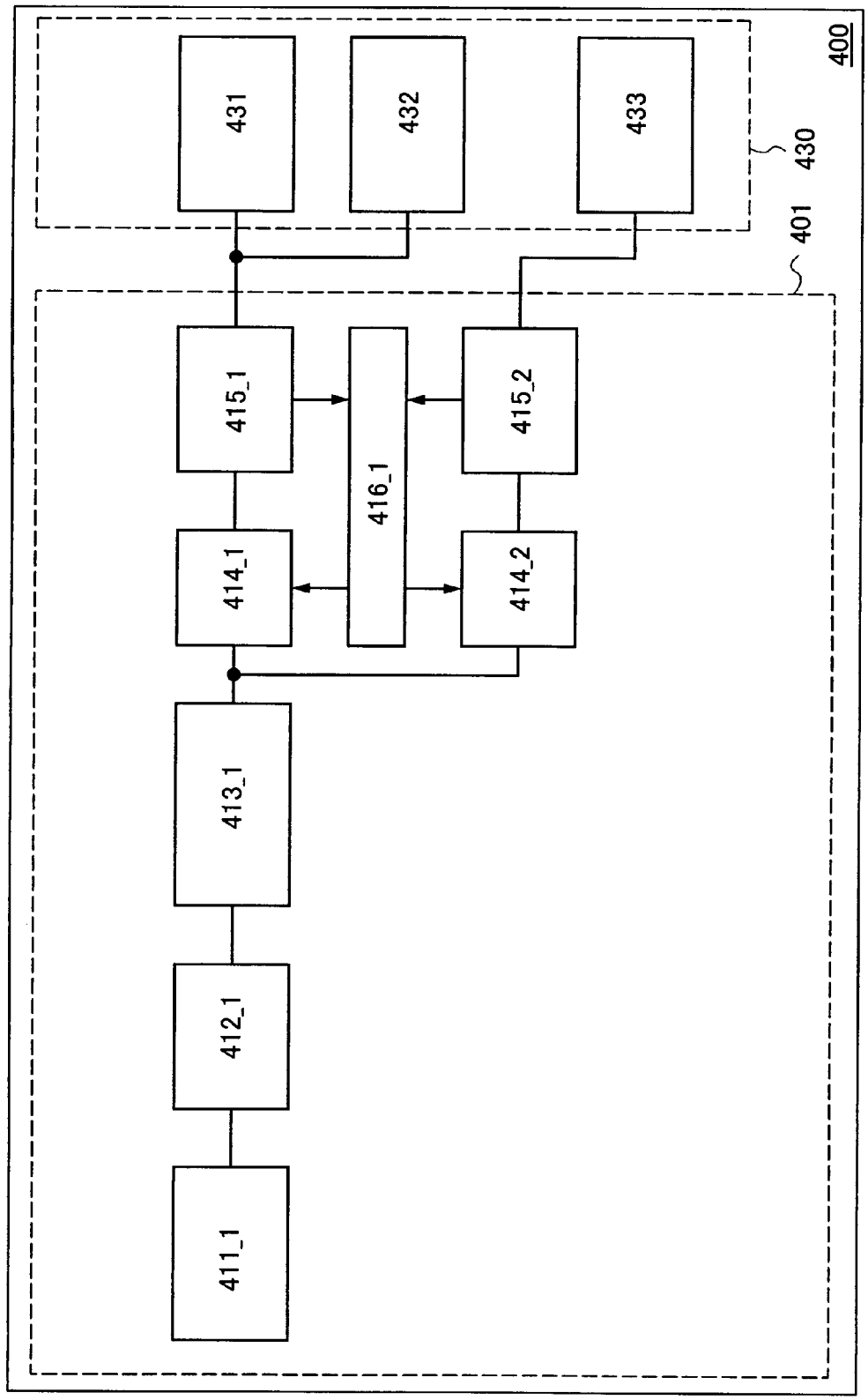
FIG. 8 illustrates one structural example of a wireless communication device of the present invention.

In addition, a structure may be employed in which a plurality of batteries are charged through one antenna circuit. For example, as illustrated in FIG. 8, a structure may be employed in which the first battery 415_1 and the second battery 415_2 are charged using the first antenna circuit 411_1, the first rectifier circuit 412_1, the first voltage control circuit 413_1, the first switch 414_1, the second switch 414_2, and the first charge control circuit 416_1.

The plurality of batteries capable of being charged by wireless are thus each provided in the circuit, so that the wireless communication device can be charged easily. In addition, the plurality of batteries are each provided in the circuit having different power consumption, so that unnecessary power supply can be suppressed and power consumption can be reduced.

Note that the wireless communication device described in this embodiment mode can be implemented in combination with structures of wireless communication devices that will be described in other embodiment modes in this specification.

Embodiment Mode 3

In this embodiment mode, an example of a wireless communication device, which is different from that in the above embodiment modes, will be described with reference to drawings. Specifically, as an example of the wireless communication device, an RFID (Radio Frequency Identification) tag (also referred to as an IC (Integrated Circuit) tag, an IC chip, an RF tag, a wireless tag, a wireless chip, or an electronic tag) is given for the description.

The wireless communication device (hereinafter also described as an "RFID tag") described in this embodiment mode will be described with reference to block diagrams illustrated in FIGS. 9 and 10.

Figure 9:
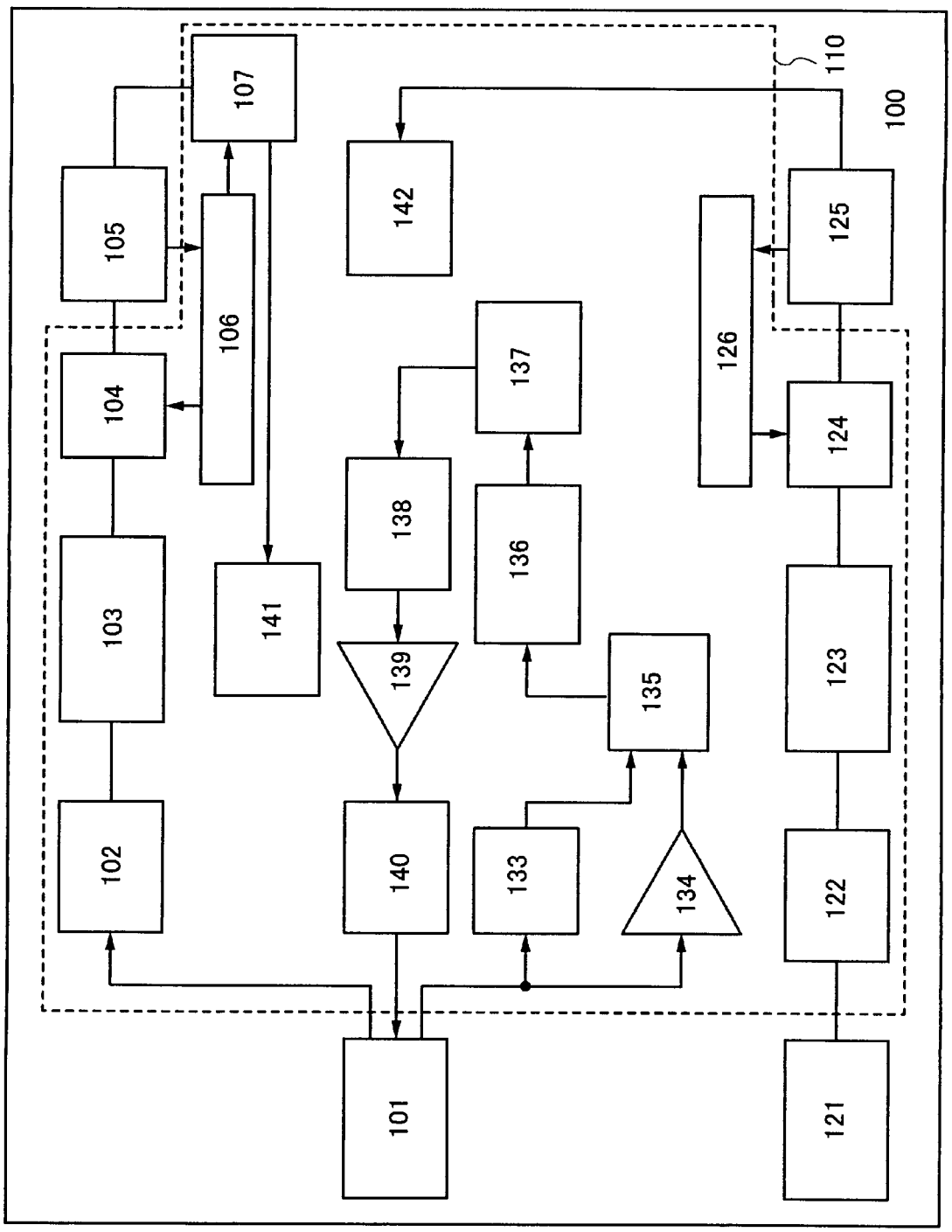
FIG. 9 illustrates one structural example of a wireless communication device of the present invention.

An RFID tag 100 illustrated in FIG. 9 has a first antenna circuit 101, a second antenna circuit 121, a signal processing circuit 110, a first battery 105, and a second battery 125. The signal processing circuit 110 has circuits for controlling charge and discharge of the first battery, circuits for controlling charge and discharge of the second battery, and circuits for receiving a particular signal from outside and controlling transmission and reception of data to and from outside (a communication control circuit).

As circuits for controlling charge and discharge of the first battery 105, a first rectifier circuit 102, a first voltage control circuit 103, a first switch 104, a first charge control circuit 106, a second switch 107, and the like are provided. As circuits for controlling charge and discharge of the second battery 125, a second rectifier circuit 122, a second voltage control circuit 123, a third switch 124, a second charge control circuit 126, and the like are provided. As the circuits for controlling transmission and reception of information through the first antenna circuit 101 (the communication control circuit), a demodulation circuit 133, an amplifier 134, a logic circuit 135, a memory control circuit 136, a memory circuit 137, a logic circuit 138, an amplifier 139, a modulation circuit 140, a first power supply circuit 141, a second power supply circuit 142, and the like are provided.

In FIG. 9, the circuits for controlling transmission and reception of information operates with the utilization of power supplied from the first battery 105 through the first power supply circuit 141 or power supplied from the second battery 125 through the second power supply circuit 142. As the first battery 105 and the second battery 125, any of the batteries and the capacitors described in the above Embodiment Mode 1 can be used.

Next, a case will be described with reference to FIGS. 10 and 14 where the first battery 105 and the second battery 125 are charged when the RFID tag 100 transmits and receives information to and from outside by wireless. Note that FIG. 10 illustrates a case where the first antenna circuit 101 receives an electric wave 202 from a reader/writer 201 (or transmits an electric wave 202 to the reader/writer 201) and the second antenna circuit 121 receives electric waves 205 that are randomly generated outside.

Figure 14:
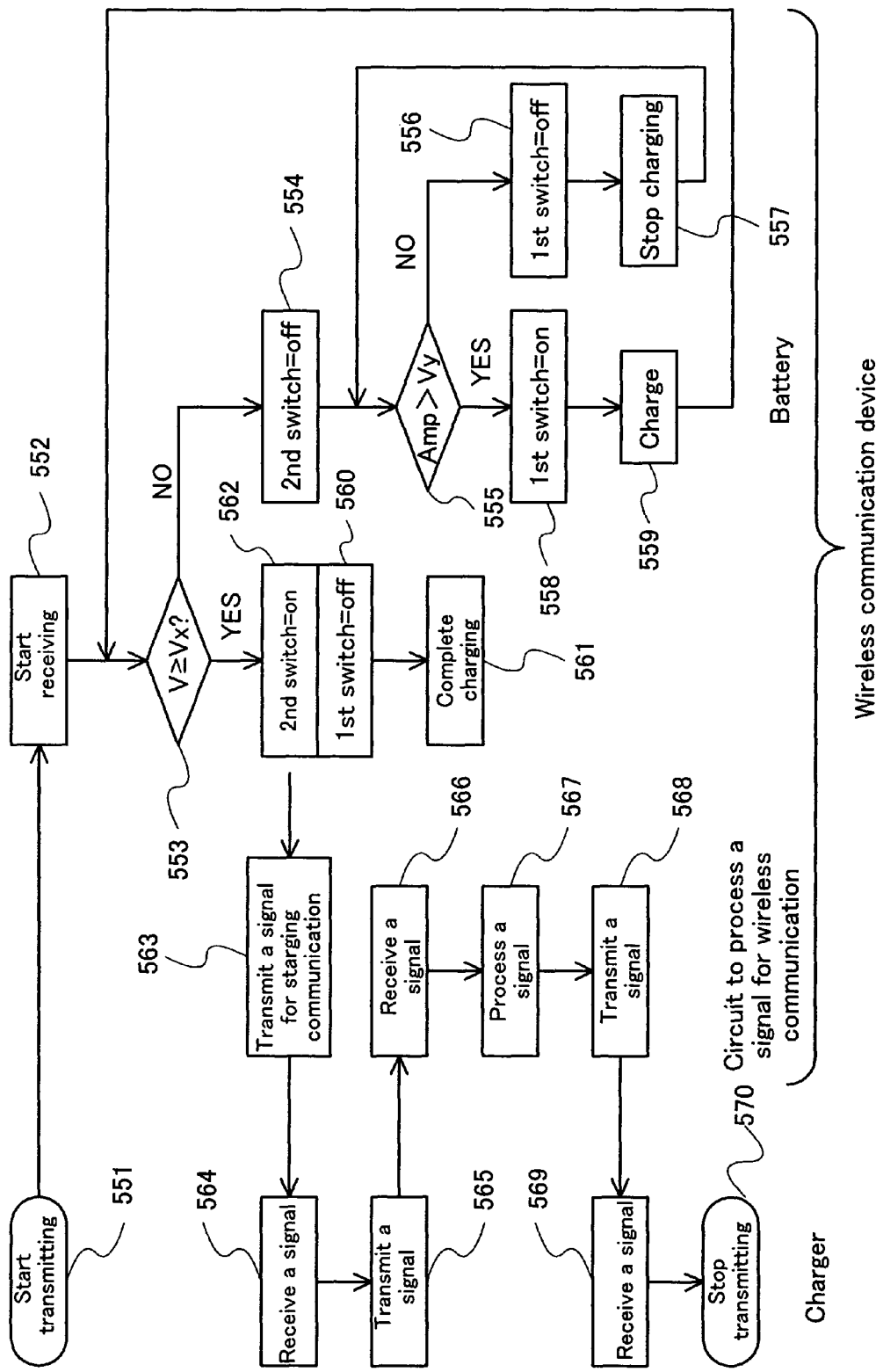
FIG. 14 illustrates an example of operations of a wireless communication device of the present invention.

The operations in which the first antenna circuit 101 receives the electric wave from the reader/writer 201 are described first with reference to FIG. 14.

First, when the electric wave is transmitted from the reader/writer 201 (551), the first antenna circuit 101 starts to receive the electric wave 202 transmitted from the reader/writer 201 (552). Next, the RFID tag 100 confirms whether the voltage of the first battery 105 is greater than or equal to a predetermined voltage value (for example, Vx) or not (553). When the voltage of the first battery 105 is less than or equal to Vx, the second switch 107 is turned off so that the power of the first battery 105 is not supplied to other circuits (554).

Next, whether the amplitude of the electric wave from the reader/writer 201 is greater than or equal to a predetermined voltage value (for example, Vy) or not is confirmed (555). When the amplitude is less than or equal to the predetermined voltage value, the first switch 104 is turned off (556) and the first battery 105 is stopped being charged (557). Then, the amplitude of the electric wave from the reader/writer 201 is on standby until it becomes greater than or equal to the predetermined voltage value. When the electric wave from the reader/writer 201 has small amplitude, the first switch 104 is turned off, so that the power from the first battery 105 to the first antenna circuit 101 can be prevented from being flowed backward.

When the amplitude of the electric wave from the reader/writer 201 is greater than or equal to the predetermined voltage value, the first switch 104 is turned on (558) and the first battery 105 is started to be charged (559). The charge condition of the first battery 105 is monitored by the first charge control circuit 106 during the charge, and the voltage value of the first battery 105 is monitored. Then, when the voltage of the first battery 105 becomes greater than or equal to the predetermined voltage value, the first switch 104 is turned off (560) and the charge is stopped (561).

Next, the second switch 107 is turned on at the same time as or after the first switch 104 is turned off (562), the circuits provided in the signal processing circuit 110 are supplied with electric power through the first power supply circuit 141, and the RFID tag 100 transmits an electric wave including a signal that starts communication (hereinafter simply described as a "signal" in some cases) to the reader/writer 201 (563). Then, after the reader/writer 201 receives the signal (564), information which is necessary is transmitted to the RFID tag 100 (565). The RFID tag 100 receives a signal transmitted from the reader/writer 201 (566), processes the received signal (567), and transmits a reply signal (568). Then, after the reader/writer 201 receives the signal transmitted from the RFID tag 100, communication is completed (570).

Subsequently, the operations in which the second antenna circuit 121 receives the outside electric waves 205 are described.

When the second antenna circuit 121 receives the electric waves 205 from outside, the RFID tag 100 confirms whether the voltage of the second battery 125 is greater than or equal to the predetermined voltage value or not. When the voltage of the second battery 125 is less than or equal to the predetermined voltage value, the third switch 124 is turned on (or the on state is maintained) and the second battery 125 is charged.

The charge condition of the second battery 125 is monitored by the second charge control circuit 126 during the charge, and the voltage value of the second battery 125 is monitored. When the voltage of the second battery 125 becomes greater than or equal to the predetermined voltage value, the third switch 124 is turned off and the charge is stopped. The third switch 124 is turned off, which prevents overcharge of the second battery 125. Then, when the voltage of the second battery 125 becomes lower than the predetermined voltage value, the third switch is turned on and the second battery 125 is charged.

The power stored in the second battery 125 is supplied to the signal processing circuit 110 through the second power supply circuit 142. Here, the second battery 125 has a structure in which power is uninterruptedly supplied to the second power supply circuit 142.

The second battery 125 which uninterruptedly supplies power to the RFID tag 100 is thus provided, so that a halt of the system of the RFID tag 100 due to power failure of one of the batteries can be prevented. In addition, with the utilization of the electric waves that are randomly generated outside to charge the second battery 125, a charger or the like for charging the second battery 125 is not necessarily added. The antenna provided in the second antenna circuit 121 is designed to have a length or a shape with which these electric waves that are generated outside are received easily. Further, a plurality of antennas having different shapes may be provided in the second antenna circuit 121, so that the charge efficiency of the second battery 125 can be improved by reception of a plurality of radio waves from outside.

When power is uninterruptedly supplied to the second power supply circuit 142 from the second battery 125, it is preferred to provide a circuit which is supplied with electric power from the second battery 125 has low power consumption. For example, the RFID tag 100 is provided with a display portion using a liquid crystal display element and the display portion is supplied with power from the second battery 125, so that display of a still image or display of time or the like can be performed always. In addition, the RFID tag 100 is mounted on a display device having a low power consumption such as electronic paper, so that replacement of the batteries is unnecessary and the received information can be displayed by wireless.

The shape of an antenna provided in the first antenna circuit 101 is also not particularly limited. That is, as a signal transmission method applied to the RFID tag 100, an electromagnetic coupling method, an electromagnetic induction method, a microwave method, or the like can be used. A transmission method can be sorted as appropriate by a practitioner in consideration of usage, and an antenna with an optimum shape and length may be provided according to an applied transmission method.

For example, when an electromagnetic coupling method or an electromagnetic induction method (for example, a 13.56 MHz band) is applied as the transmission method, electromagnetic induction caused by a change in magnetic field density is utilized. Therefore, a conductive film functioning as an antenna is formed in an annular shape (for example, a loop antenna) or a spiral shape (for example, a spiral antenna) in the first antenna circuit 101.

Further, when a microwave method (for example, a UHF band (860 to 960 MHz band), a 2.45 GHz band, or the like) is applied as the transmission method, the length or the shape of the conductive film functioning as the antenna may be set as appropriate in the first antenna circuit 101 in consideration of a wavelength of an electric wave used for signal transmission. For example, the conductive film functioning as the antenna can be formed in a linear shape (for example, a dipole antenna), a flat shape (for example, a patch antenna), or the like. The shape of the conductive film functioning as the antenna is not limited to a linear shape, and may be formed in a curved-line shape, a meandering shape, or a combination thereof, in consideration of a wavelength of an electromagnetic wave.

Figure 10:
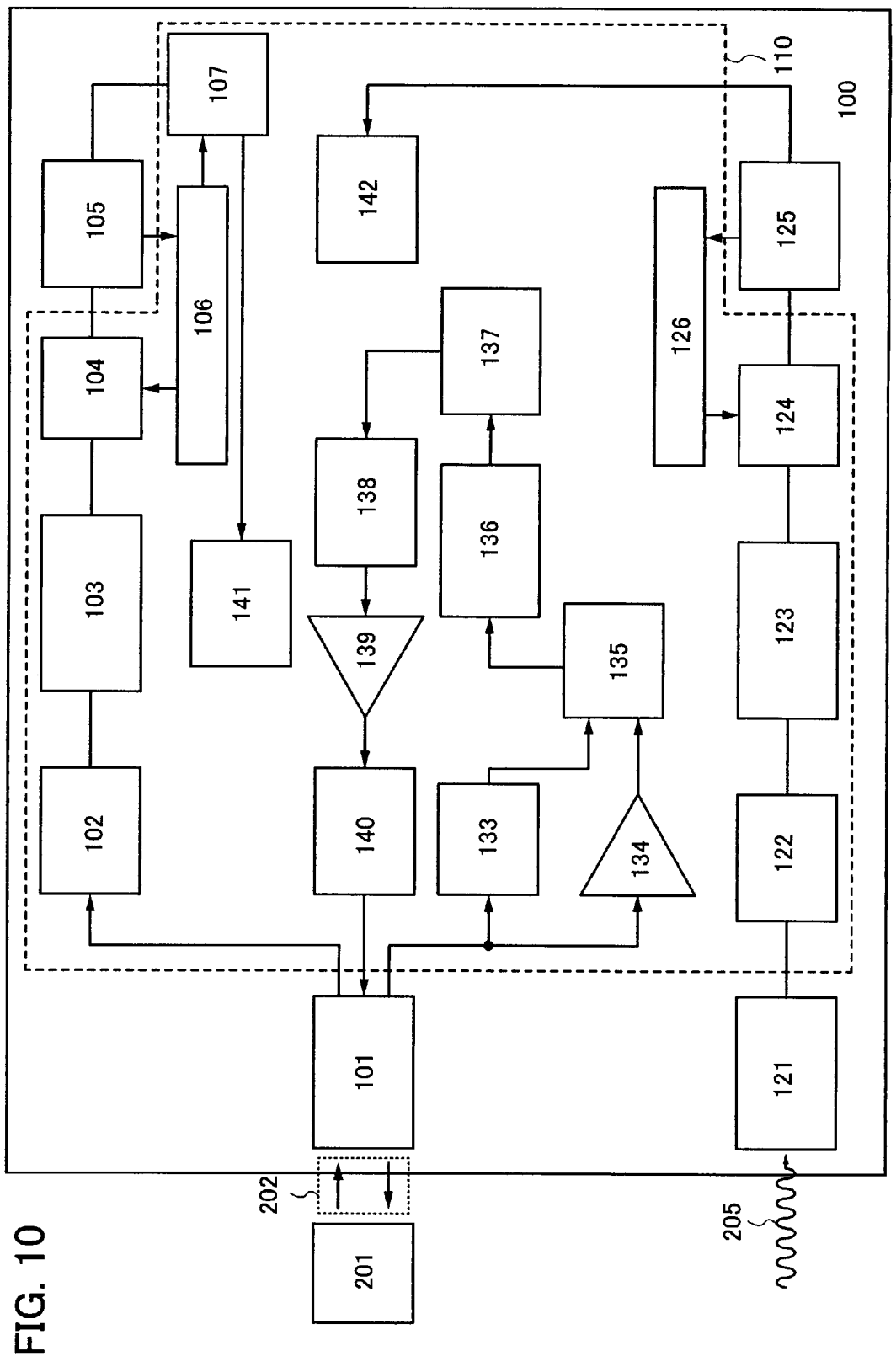
FIG. 10 illustrates one structural example of a wireless communication device of the present invention.
Figure 11:
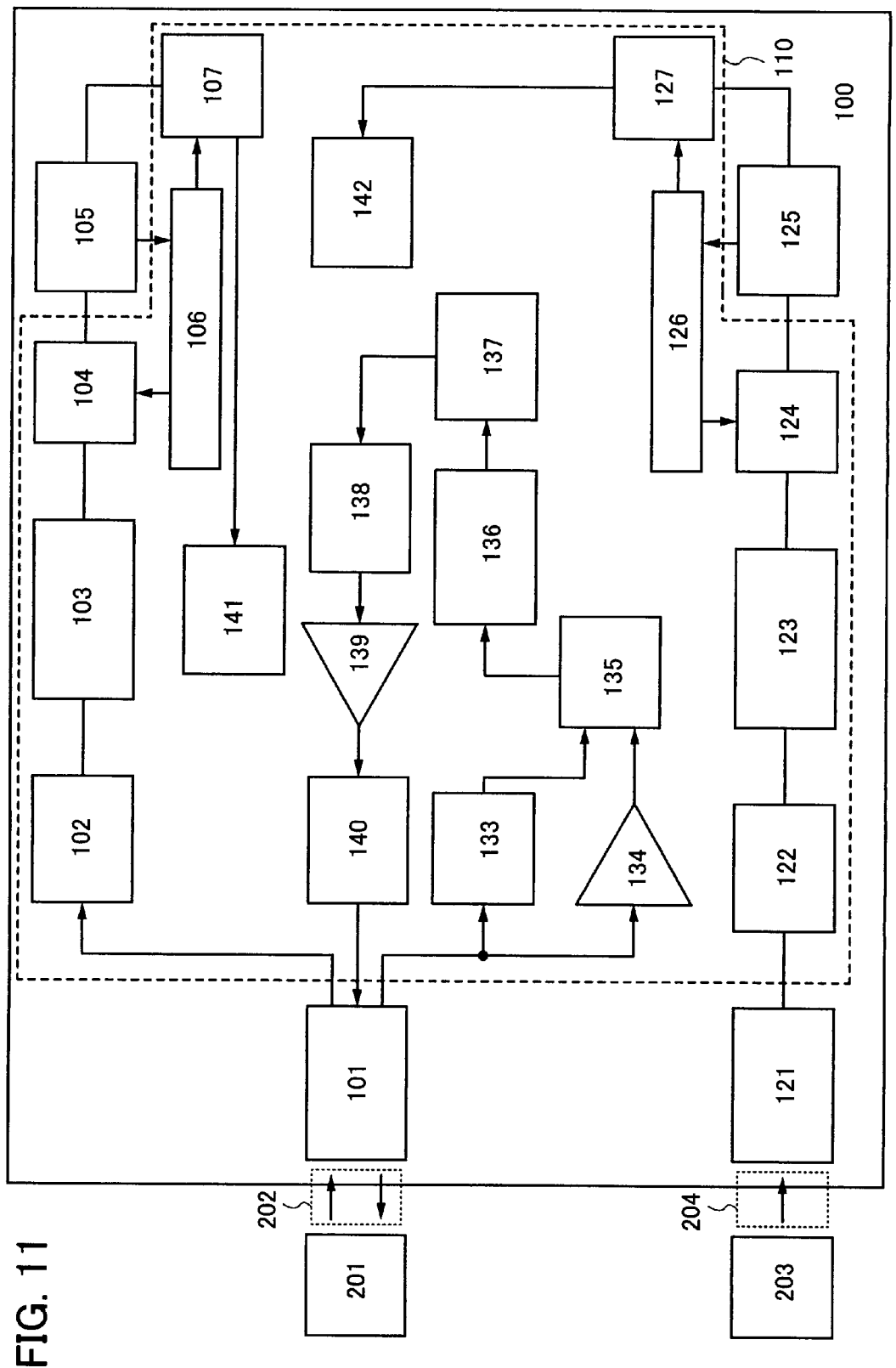
FIG. 11 illustrates one structural example of a wireless communication device of the present invention.

Note that, in the RFID tag 100 illustrated in FIG. 10, the example is shown in which the electric waves that are randomly generated outside are utilized to charge second battery 125; however, a structure may be employed in which the second battery 125 is charged with provision of a power feeder. When the second battery 125 is charged using an electric wave 204 oscillated from a power feeder 203, a fourth switch 127 may be provided between the second battery 125 and the second power supply circuit 142 to control discharge of the second battery 125 (see FIG. 11).

For example, a structure can be employed in which the first antenna circuit 101 is provided with an antenna that receives an electric wave of a UHF band, a 2.45 GHz band, or the like, and the second antenna circuit 121 is provided with an antenna that receives an electric wave of a 13.56 MHz band. In this structure, signals can be transmitted and received with a microwave method, and the batteries can be charged by a microwave method and an electromagnetic induction method. In addition, a structure may be employed in which the second antenna circuit 121 is also provided with a modulation circuit, a demodulation circuit, and the like in a similar manner to the first antenna circuit 101, so that information is transmitted and received to and from outside through the second antenna circuit 121.

Next, one structural example of the RFID tag of this embodiment mode is described. Note that, here, the antenna provided in the first antenna circuit 101 has a coil shape and the antenna provided in the second antenna circuit 121 has a dipole shape.

The RFID tag 100 of this embodiment mode can exist in a layout in which the first antenna circuit 101, the second antenna circuit 121, the signal processing circuit 110, the first battery 105, and the second battery 125 are stacked or arranged in parallel over a substrate 120.

Figure 15:
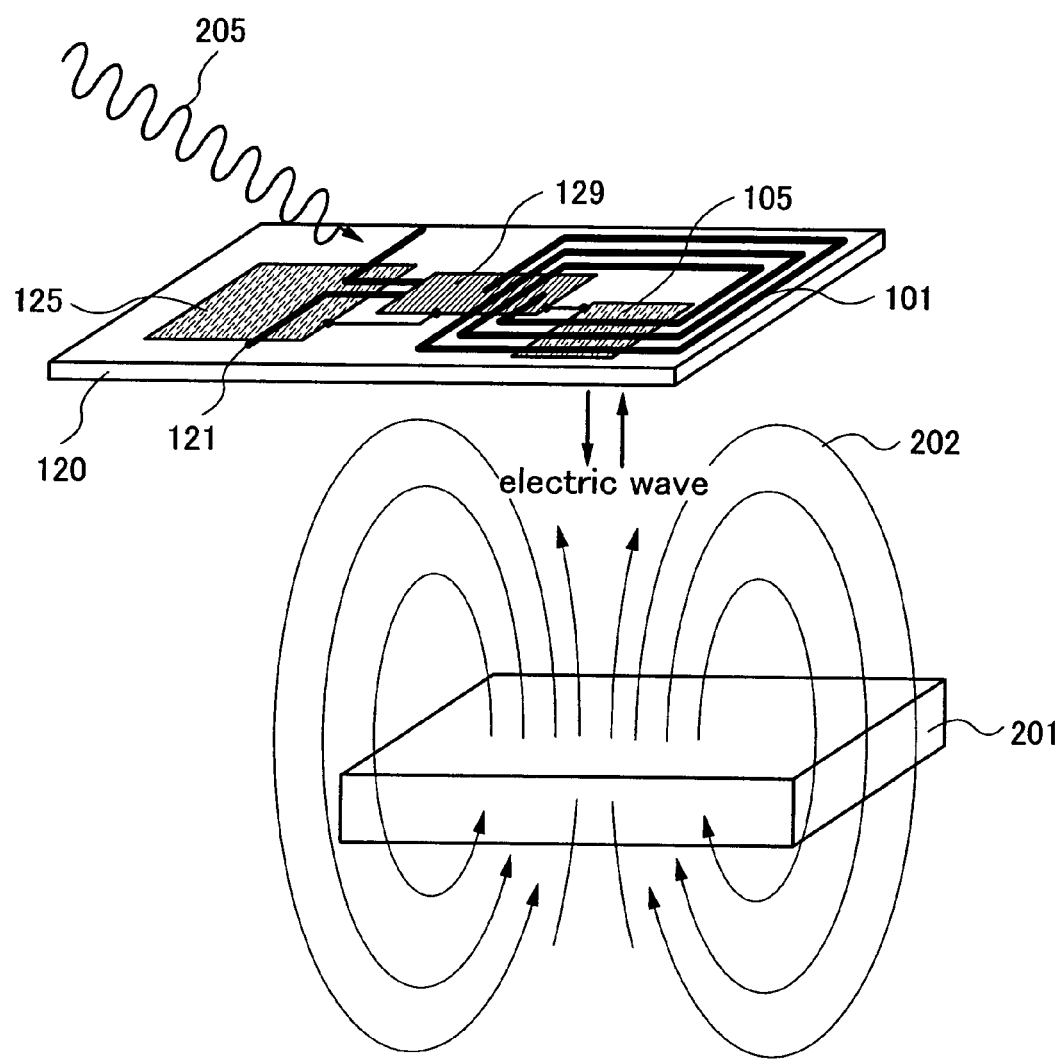
FIG. 15 illustrates one structural example of a wireless communication device of the present invention.

An RFID tag illustrated in FIG. 15 has the first antenna circuit 101, the second antenna circuit 121, a chip 129 which includes the signal processing circuit 110, the first battery 105, and the second battery 125 over the substrate 120. Note that the first antenna circuit 101 and the second antenna circuit 121 are electrically connected to the signal processing circuit 110 provided in the chip 129.

After the electric wave 202 transmitted from the reader/writer 201 is received by the first antenna circuit 101, the electric wave operates as illustrated in FIG. 14, and the first battery 105 is charged. In addition, the outside electric waves 205 are received by the second antenna circuit 121, and the second battery 125 is charged.

Here, the example is shown in which the electric waves transmitted from the reader/writer 201 are received by the first antenna circuit 101 and the electric waves that are randomly generated outside is received by the second antenna circuit 121.

The first battery 105 and the second battery 125 are electrically connected to the signal processing circuit provided in the chip 129, and power is supplied as appropriate to the power supply circuit in the signal processing circuit from the first battery 105 and the second battery 125. The connection of each of the first battery 105 and the second battery 125 to the chip 129 is not particularly limited, and a wire boding connection or a bump connection can be employed for the connection, for example.

An example of a reader/writer 201 in FIG. 15 is described with reference to FIG. 16. The reader/writer 201 includes a receiving portion 501, a transmitting portion 502, a control portion 503, an interface portion 504, and an antenna circuit 505. The control portion 503 controls the receiving portion 501 and the transmitting portion 502 base on a data process order and a data process result, and the control portion 503 is controlled by a higher-level device 506 through the interface portion 504. The transmitting portion 502 modulates a data process order to be transmitted to the RFID tag 100, and then outputs it as an electromagnetic wave from the antenna circuit 505. The receiving portion 501 demodulates a signal received by the antenna circuit 505, and then outputs it as a data process result to the control portion 503.

Figure 16:
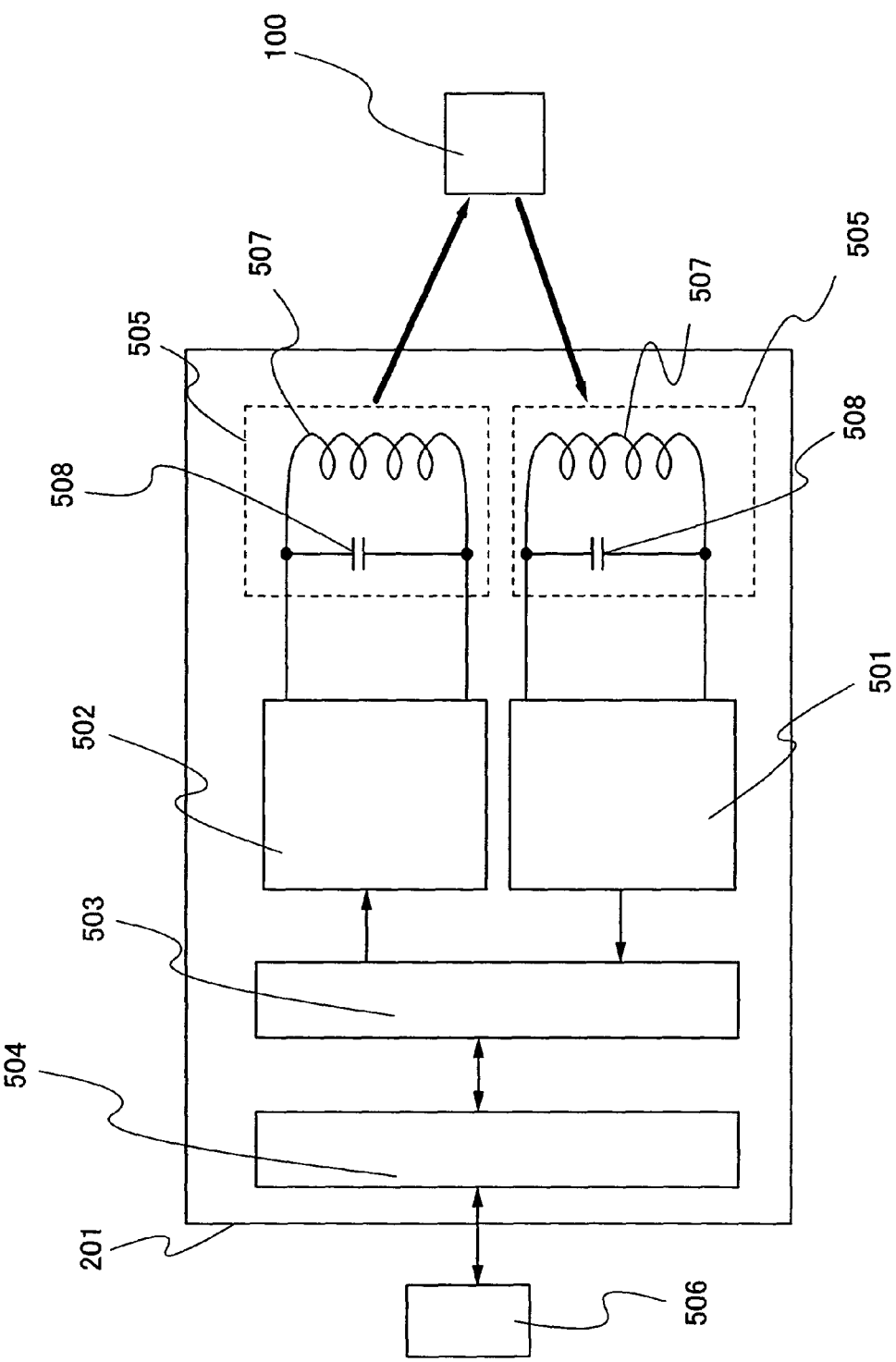
FIG. 16 illustrates one structural example of a reader/writer that transmits electric waves to a wireless communication device of the present invention.

In this embodiment mode, the antenna circuit 505 of the reader/writer 201 illustrated in FIG. 16 is connected to the receiving portion 501 and the transmitting portion 502, and has an antenna 507 and a resonant capacitor 508 that form an LC parallel resonance circuit. The antenna circuit 505 receives as an electronic signal an electromotive force induced to the antenna circuit 505 by a signal outputted from the RFID tag 100. Moreover, the antenna circuit 505 is supplied with an induction current to transmit a signal to the RFID tag 100.

The length and shape of the second antenna circuit 121 are not limited to the structure illustrated in FIG. 15. Here, the example is shown in which linear antenna having different lengths (dipole antennas) are provided to the second antenna circuit 121. Alternatively, for example, a coiled antenna or a patch antenna may be used. Note that an antenna having a different length and a shape is provided as the antenna of the first antenna circuit 101, so that charging efficiency can be improved.

In a similar way, the antenna of the first antenna circuit 101 used for transmitting and receiving a signal to and from the reader/writer 201 is not limited to the structure illustrated in FIG. 15. As described above, antennas having various lengths and shapes can be used depending on a transmission method to be applied.

For example, as for the frequency of a signal transmitted and received between the first antenna circuit 101 and the reader/writer 201, 125 KHz, 13.56 MHz, 915 MHz, 2.45 GHz, and the like are given, and each of which is prescribed by the ISO standard. However, the frequency of a signal transmitted and received between the first antenna circuit 101 and the reader/writer 201 is not limited thereto, and any of the following may be employed, for example: a submillimeter wave of 300 GHz to 3 THz; a millimeter wave of 30 GHz to 300 GHz; a microwave of 3 GHz to 30 GHz; an ultrashort wave of 300 MHz to 3 GHz; a very short wave of 30 MHz to 300 MHz; a short wave of 3 MHz to 30 MHz; a medium wave of 300 KHz to 3 MHz; a long wave of 30 KHz to 300 KHz; and a very long wave of 3 KHz to 30 KHz. Note that the signal transmitted and received between the first antenna circuit 101 and the reader/writer 201 is a signal obtained by modulation of a carrier wave. A carrier wave may be modulated by either analog modulation or digital modulation, and any of amplitude modulation, phase modulation, frequency modulation, and spread spectrum modulation may be employed. Preferably, amplitude modulation or frequency modulation is employed.

As described above, the RFID tag described in this embodiment mode has the batteries capable of being charged by wireless. Therefore, in contrast to the conventional case, shortage of power for transmitting and receiving individual information, which results from the consumption of a battery, can be prevented. In addition, the batteries can be charged by using an outside wireless signal without being directly connected to a charger. Therefore, it is possible to uninterruptedly use the RFID tag without confirmation of remaining capacity of a battery and replacement of batteries, which is in contrast to the conventional active RFID tag. Besides, power for driving the RFID tag can be always retained in the batteries, so that power enough for operation of the RFID tag can be obtained and communication distance with the reader/writer can be extended.

Note that the structure described in this embodiment mode can be applied without limitation to the RFID tag as long as being a case of a wireless communication device in which data communication is performed by wireless communication. In addition, the wireless communication device described in this embodiment mode can be implemented in combination with structures of wireless communication devices that will be described in other embodiment modes in this specification.

Embodiment Mode 4

In this embodiment mode, an example of a manufacturing method of the wireless communication device described in the above embodiment mode will be described with reference to drawings.

Figure 19A:
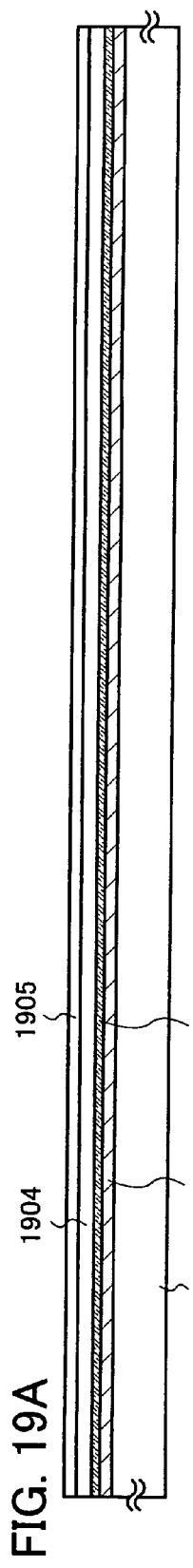
FIGS. 19A to 19D illustrate one example of a manufacturing method of a wireless communication device of the present invention.

First, as illustrated in FIG. 19A, a peeling layer 1903 is formed over one side of a substrate 1901 with an insulating film 1902 interposed therebetween. Subsequently, an insulating film 1904 that function as base film and a semiconductor film 1905 (for example, a film containing amorphous silicon) are stacked. Note that the insulating film 1902, the peeling layer 1903, the insulating film 1904, and the semiconductor film 1905 may be sequentially formed.

As the substrate 1901, a glass substrate, a quartz substrate, a metal substrate (for example, a stainless steel substrate or the like), a ceramic substrate, or a semiconductor substrate such as a Si substrate can be used. Alternatively, a substrate formed of polyethylene terephthalate (PET), polyethylene naphthalate (PEN), polyether sulfone (PES), acrylic polymer, or the like can be used as a plastic substrate. Note that, in this step, the peeling layer 1903 is provided over the entire surface of the substrate 1901 with the insulating film 1902 interposed therebetween; however, the peeling layer 1903 may be selectively provided by a photolithography method, if necessary, after the peeling layer is provided over entire surface of the substrate 1901.

The insulating films 1902 and 1904 are each formed of an insulating material such as silicon oxide, silicon nitride, silicon oxynitride ($SiO_xN_y$, x>y>0), or silicon nitride oxide ($SiN_xO_y$, x>y>0), by a CVD method, a sputtering method, or the like. For example, in a case where the insulating films 1902 and 1904 each have a two-layer structure, a silicon nitride oxide film may be formed as a first insulating film and a silicon oxynitride film may be formed as a second insulating film. Alternatively, a silicon nitride film may be formed as the first insulating film and a silicon oxide film may be formed as the second insulating film. The insulating film 1902 functions as a blocking layer for preventing an impurity element in the substrate 1901 from being mixed into the peeling layer 1903 or an element formed thereover. The insulating film 1904 functions as a blocking layer for preventing an impurity element in the substrate 1901 and the peeling layer 1903 from being mixed into an element formed over the substrate 1901 and the peeling layer 1903. The insulating films 1902 and 1904 each functioning as a blocking layer are thus formed, so that it is possible to prevent alkaline earth metal or alkali metal such as Na in the substrate 1901 and an impurity element included in the peeling layer 1903 from adversely affecting an element to be formed over the substrate 1901 and the peeling layer 1903. In a case of using quartz for the substrate 1901, the insulating films 1902 and 1904 may be omitted.

As the peeling layer 1903, a metal film, a stacked layer structure of a metal film and a metal oxide film, or the like can be used. The metal film is formed as a single layer or stacked layers of a film formed of an element of tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy or a compound including the above element as its main component. The metal film can be formed by a sputtering method, various CVD methods such as a plasma CVD method, or the like. The stacked layer structure of a metal film and a metal oxide film can be formed by performance of plasma treatment in an oxygen atmosphere or an $N_2O$ atmosphere, or heat treatment in an oxygen atmosphere or an $N_2O$ atmosphere after the formation of the above metal film. In this case, an oxide or an oxynitride of the metal film is formed on the metal film surface. For example, when a tungsten film is formed as the metal film by a sputtering method, a CVD method, or the like, a metal oxide film of tungsten oxide can be formed on the tungsten film surface by plasma treatment of the tungsten film. Alternatively, for example, a metal film (such as tungsten) is formed and then an insulating film of silicon oxide ($SiO_2$) or the like is formed over the metal film by a sputtering method. Moreover, a metal oxide may be formed over the metal film (for example, tungsten oxide over tungsten).

The semiconductor film 1905 is formed with a thickness of 25 to 200 nm (preferably 30 to 150 nm) by a sputtering method, an LPCVD method, a plasma CVD method, or the like.

Figure 19B:
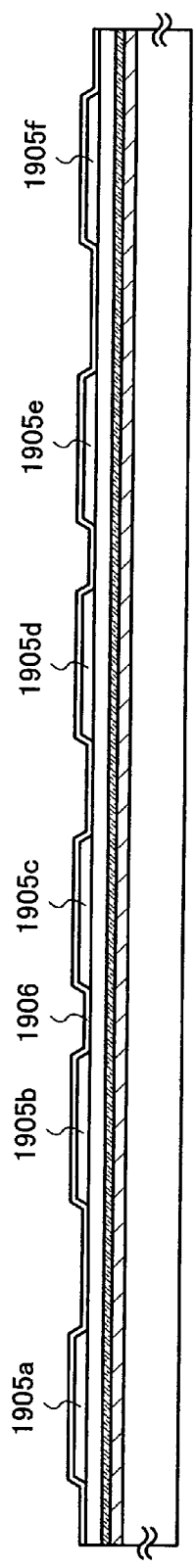

Next, as illustrated in FIG. 19B, the semiconductor film 1905 is crystallized by being irradiated with laser light. Note that the semiconductor film 1905 may be crystallized by a method in which a laser irradiation method is combined with a thermal crystallization method using a rapid thermal annealing (RTA) process or an annealing furnace, or a thermal crystallization method using a metal element for promoting crystallization, or the like. Thereafter, the obtained crystalline semiconductor film is etched so as to have a desired shape, thereby forming crystalline semiconductor films 1905a to 1905f. Then, a gate insulating film 1906 is formed so as to cover the crystalline semiconductor films 1905a to 1905f.

The insulating film 1906 is formed of an insulating material such as silicon oxide, silicon nitride, silicon oxynitride ($SiO_xN_y$, x>y>0), or silicon nitride oxide ($SiN_xO_y$, x>y>0) by a CVD method, a sputtering method, or the like. For example, in a case where the gate insulating film 1906 has a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

An example of a manufacturing process of the crystalline semiconductor films 1905a to 1905f is briefly described below. First, an amorphous semiconductor film with a thickness of 50 to 60 nm is formed by a plasma CVD method. Next, a solution containing nickel that is a metal element for promoting crystallization is retained on the amorphous semiconductor film, and dehydrogenation treatment (at 500° C., for one hour) and thermal crystallization treatment (at 550° C., for 4 hours) are performed, thereby forming a crystalline semiconductor film. Thereafter, the crystalline semiconductor film is irradiated with laser light and a photolithography method is used, so that the crystalline semiconductor films 1905a to 1905f are formed. Note that, without being subjected to the thermal crystallization which uses the metal element for promoting crystallization, the amorphous semiconductor film may be crystallized only by laser light irradiation.

As a laser oscillator used for crystallization, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser, or an excimer laser; a laser of which medium is single crystalline YAG, $YVO_4$, forsterite ($Mg_2SiO_4$), YAlO$_3$, or GdVO$_4$, or polycrystalline (ceramic) YAG, Y$_2$O$_3$, YVO$_4$, YAlO$_3$, or GdVO$_4$, added with one or more of Nd, Yb, Cr, Ti, Ho, Er, Tm, or Ta as a dopant; a glass laser; a ruby laser; an alexandrite laser; a Ti: sapphire laser; a copper vapor laser; or a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:YVO$_4$ laser (fundamental wave of 1064 nm) can be used. In this case, a laser power density of approximately 0.01 to 100 MW/cm$^2$ (preferably, 0.1 to 10 MW/cm$^2$) is necessary. Irradiation is performed at a scanning rate of approximately 10 to 2000 cm/sec. Note that a laser using, as a medium, single crystalline YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$ added with one or more of Nd, Yb, Cr, Ti, Ho, Er, Tm, and Ta as a dopant; an Ar ion laser; or a Ti: sapphire laser can be continuously oscillated. Further, pulse oscillation thereof can be performed at a repetition rate of 10 MHz or more by carrying out Q switch operation, mode locking, or the like. In a case when a laser beam is oscillated at a repetition rate of 10 MHz or more, after a semiconductor film is melted by a laser and before it is solidified, the semiconductor film is irradiated with a next pulse. Therefore, unlike a case of using a pulsed laser with a low repetition rate, a solid-liquid interface can be continuously moved in the semiconductor film, so that crystal grains which are continuously grown in a scanning direction can be obtained.

Alternatively, the gate insulating film 1906 may be formed by performance of the above high-density plasma treatment on the semiconductor films 1905a to 1905f to oxidize or nitride the surfaces. For example, the film is formed by plasma treatment introducing a mixed gas of a rare gas such as He, Ar, Kr, or Xe and oxygen, nitrogen oxide (NO$_2$), ammonia, nitrogen, hydrogen, or the like. When excitation of the plasma is performed by introduction of a microwave, high-density plasma can be generated at a low electron temperature. By an oxygen radical (there is a case where an OH radical is included) or a nitrogen radical (there is a case where an NH radical is included) generated by this high-density plasma, the surface of the semiconductor film can be oxidized or nitrided.

By treatment using such high-density plasma, an insulating film with a thickness of 1 to 20 nm, typically 5 to 10 nm, is formed over the semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon or polycrystalline silicon) directly, distribution of a thickness of the insulating film to be formed can be drastically reduced. In addition, oxidation is not vigorous even in a crystal grain boundary of crystalline silicon, which provide a very preferable condition. That is, by a solid-phase oxidation of the surface of the semiconductor film by the high-density plasma treatment described here, an insulating film with high uniformity and low interface state density can be formed without abnormal oxidation reaction in a crystal grain boundary.

As the gate insulating film 1906, an insulating film formed by the high-density plasma treatment may be used by itself, or an insulating film of silicon oxide, silicon oxynitride, silicon nitride, or the like may be formed thereover by a CVD method utilizing plasma or thermal reaction, so as to make stacked layers. In any case, a transistor including an insulating film formed by high-density plasma in part of the gate insulating film or in the entire gate insulating film has reduced variation in the characteristics.

In addition, a semiconductor film is irradiated with a continuous wave laser or a laser beam oscillated at a repetition rate of greater than or equal to 10 MHz and is scanned in one direction for crystallization, so that the semiconductor films 1905a to 1905f, which have a characteristic that the crystal grows in the scanning direction of the beam, are obtained. When a transistor is arranged so that the scanning direction is aligned with the channel length direction (the direction in which carriers flow when a channel formation region is formed) and the above gate insulating layer is used, a thin film transistor (TFT) with less characteristic variation and high electric-field effect mobility can be obtained.

Next, a first conductive film and a second conductive film are stacked over the gate insulating film 1906. Here, the first conductive film is formed with a thickness of 20 to 100 nm by a CVD method, a sputtering method, or the like, and the second conductive film is formed with a thickness of 100 to 400 nm. The first conductive film and the second conductive film are formed using an element of tantalum (Ta), tungsten (W), titanium (Ti), molybdenum (Mo), aluminum (Al), copper (Cu), chromium (Cr), niobium (Nb), or the like, or an alloy or a compound including the above element as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a stacked layer structure of a molybdenum film, an aluminum film, and a molybdenum film is preferably employed.

Next, a resist mask is formed by a photolithography method, and etching treatment for forming a gate electrode and a gate line is performed, so that gate electrodes 1907 are formed above the semiconductor films 1905a to 1905f. Here, an example is shown in which the gate electrode 1907 has a stacked layer structure of a first conductive film 1907a and a second conductive film 1907b.

Figure 19C:
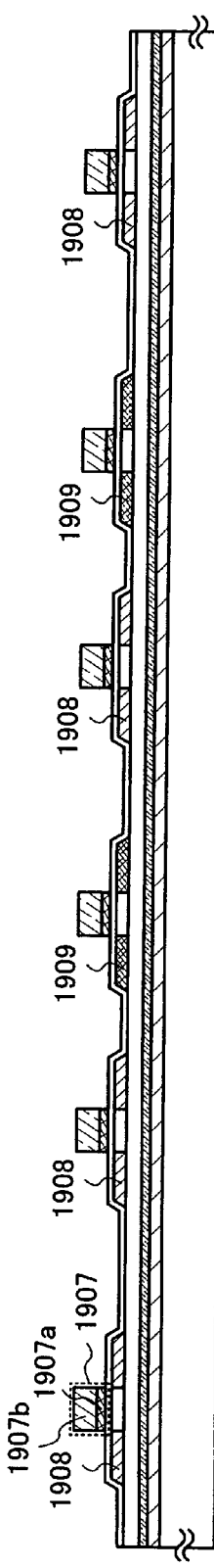

Next, as illustrated in FIG. 19C, with the use of the gate electrode 1907 as a mask, an impurity element imparting n-type conductivity is added to the semiconductor films 1905a to 1905f at a low concentration by an ion doping method or an ion implantation method. Then, a resist mask is selectively formed by a photolithography method and an impurity element imparting p-type conductivity is added at a high concentration. As an n-type impurity element, phosphorus (P), arsenic (As), or the like can be used. As a p-type impurity element, boron (B), aluminum (Al), gallium (Ga), or the like can be used. Here, phosphorus (P) is used for the impurity element imparting n-type conductivity, and is selectively introduced into the semiconductor films 1905a to 1905f at a concentration of $1 \times 10^{15}$ to $1 \times 10^{19}$/cm$^3$, so that n-type impurity regions 1908 are formed. In addition, boron (B) is used for the impurity element imparting p-type conductivity, and is selectively introduced into the semiconductor films 1905c and 1905e at a concentration of $1 \times 10^{19}$ to $1 \times 10^{21}$/cm$^3$, so that p-type impurity regions 1909 are formed.

Next, an insulating film is formed so as to cover the gate insulating film 1906 and the gate electrodes 1907. The insulating film is formed as a single layer or stacked layers of a film including an inorganic material such as silicon, an oxide of silicon, or a nitride of silicon, or an organic material such as an organic resin by a plasma CVD method, a sputtering method, or the like. Next, the insulating film is selectively etched by anisotropic etching which mainly etches in a vertical direction, so that insulating films 1910 (also referred to as sidewalls) which are in contact with side surfaces of the gate electrodes 1907 are formed. The insulating films 1910 are used as masks for doping when LDD (Lightly Doped Drain) regions are formed later.

Subsequently, with the use of a resist mask formed by a photolithography method, the gate electrodes 1907, and the insulating films 1910 as masks, an impurity element imparting n-type conductivity is added to the semiconductor films 1905*a*, 1905*b*, 1905*d*, and 1905*f*, so that n-type impurity regions 1911 are formed. Here, phosphorus (P) is used for the impurity element imparting n-type conductivity, and is selectively introduced into the semiconductor films 1905*a*, 1905*b*, 1905*d*, and 1905*f* at a concentration of $1 \times 10^{19}$ to $1 \times 10^{20}/cm^3$, so that the n-type impurity regions 1911 with higher concentration than the n-type impurity regions 1908 are formed.

Figure 19D:
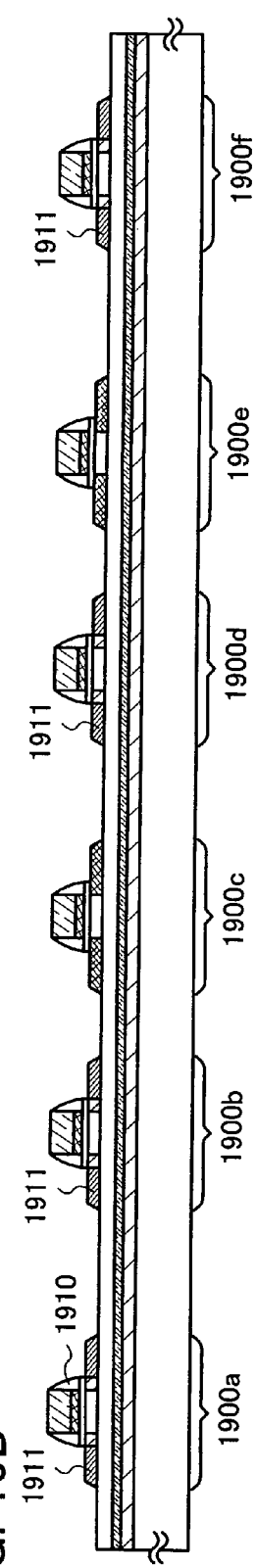

Through above steps, as illustrated in FIG. 19D, n-channel thin film transistors 1900*a*, 1900*b*, 1900*d*, and 1900*f*, and p-channel thin film transistors 1900*c* and 1900*e* are formed.

Note that, in the n-channel thin film transistor 1900*a*, a channel formation region is formed in a region of the semiconductor film 1905*a*, which is overlapped with the gate electrode 1907; the impurity region 1911 forming a source region or a drain region is formed in a region which is not overlapped with the gate electrode 1907 and the insulating film 1910; and a lightly doped drain region (LDD region) is formed in a region which is overlapped with the insulating film 1910 and is between the channel formation region and the impurity region 1911. In the n-channel thin film transistors 1900*b*, 1900*d*, and 1900*f*, a channel formation region, a lightly doped drain region, and the impurity region 1911 are formed in a similar manner.

In the p-channel thin film transistor 1900*c*, a channel formation region is formed in a region of the semiconductor film 1905*c*, which is overlapped with the gate electrode 1907; and the impurity regions 1909 each forming a source region or a drain region are formed in a region which is not overlapped with the gate electrode 1907. In addition, in the p-channel thin film transistor 1900*e*, a channel formation region and the impurity regions 1909 are formed. Note that, although each of the p-channel thin film transistors 1900*c* and 1900*e* is not provided with an LDD region, a structure may be employed in which the p-channel thin film transistor is provided with an LDD region or the n-channel thin film transistor is not provided with an LDD region.

Figure 20A:
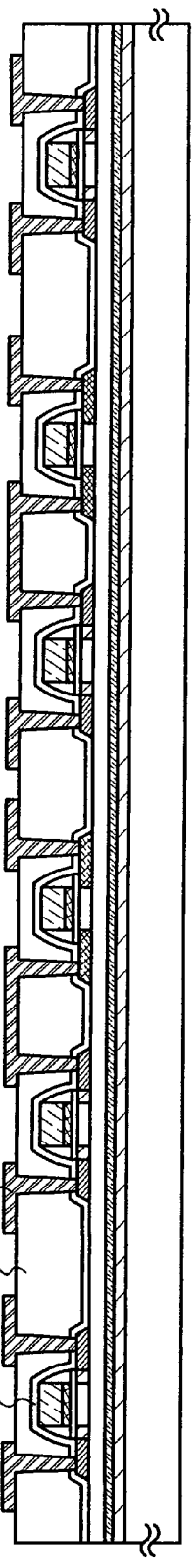
FIGS. 20A to 20C illustrate one example of a manufacturing method of a wireless communication device of the present invention.

Next, as illustrated in FIG. 20A, an insulating film is formed as a single layer or stacked layers so as to cover the semiconductor films 1905*a* to 1905*f*, the gate electrodes 1907, and the like, and conductive films 1913 is formed over the insulating film, which is electrically connected to the impurity regions 1909 and 1911 for forming source regions or drain regions of the thin film transistors 1900*a* to 1900*f*. The insulating film is formed as a single layer or stacked layers using an inorganic material such as an oxide of silicon or a nitride of silicon, an organic material such as polyimide, polyamide, benzocyclobutene-based resin, acrylic resign, or epoxy resign, a siloxane material, or the like by a CVD method, a sputtering method, an SOG method, a droplet discharging method, a screen printing method, or the like. Here, the insulating film is formed to have a two-layer structure. A silicon nitride oxide film is formed as a first insulating film 1912*a*, and a silicon oxynitride film is formed as a second insulating film 1912*b*. The conductive films 1913 form source electrodes or drain electrodes of the thin film transistors 1900*a* to 1900*f*.

Note that, before the insulating films 1912*a* and 1912*b* are formed or after one or more of thin films of the insulating films 1912*a* and 1912*b* are formed, heat treatment may be performed with the motivation of recovering the crystallinity of the semiconductor film, activating the impurity element which has been added to the semiconductor film, or hydrogenating the semiconductor film. For the heat treatment, thermal annealing, a laser annealing method, an RTA method, or the like may be applied.

The conductive films 1913 are each formed as a single layer or stacked layers using an element of aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy or a compound including the above element as its main component by a CVD method, a sputtering method, or the like. An alloy containing aluminum as its main component corresponds to a material which contains aluminum as its main component and also contains nickel, or to an alloy which contains aluminum as its main component and also contains nickel and one or both carbon and silicon, for example. The conductive film 1913 may employ, for example, a stacked layer structure of a barrier film, an aluminum-silicon (Al—Si) film, and a barrier film, or a stacked layer structure of a barrier film, an aluminum-silicon (Al—Si) film, a titanium nitride (TiN) film, and a barrier film. Note that a barrier film corresponds to a thin film formed of titanium, a nitride of titanium, molybdenum, or a nitride of molybdenum. Since aluminum and aluminum silicon have low resistance and are inexpensive, they are optimal materials for forming the conductive film 1913. In addition, generation of a hillock of aluminum or aluminum silicon can be prevented when upper and lower barrier layers are formed. The formation of the barrier film using titanium that is a highly reducible element can realize preferable contact between the conductive film and the crystalline semiconductor film because titanium reduces the oxide film formed on the semiconductor film.

Next, an insulating film 1914 is formed so as to cover the conductive films 1913, and conductive films 1915*a* and 1915*b* are formed over the insulating film 1914 so as to be electrically connected to the conductive films 1913 which form source electrodes or drain electrodes of the semiconductor films 1905*a* and 1905*f*, respectively. In addition, conductive films 1916*a* and 1916*b* are formed so as to be electrically connected to the conductive films 1913 which form source electrodes or drain electrodes of the semiconductor films 1905*b* and 1905*e*, respectively. Note that the conductive films 1915*a*, 1915*b*, 1916*a*, and 1916*b* may be formed using the same material simultaneously. Moreover, the conductive films 1915*a*, 1915*b*, 1916*a*, and 1916*b* can be formed using any of the above materials given for the conductive films 1913.

Figure 20B:
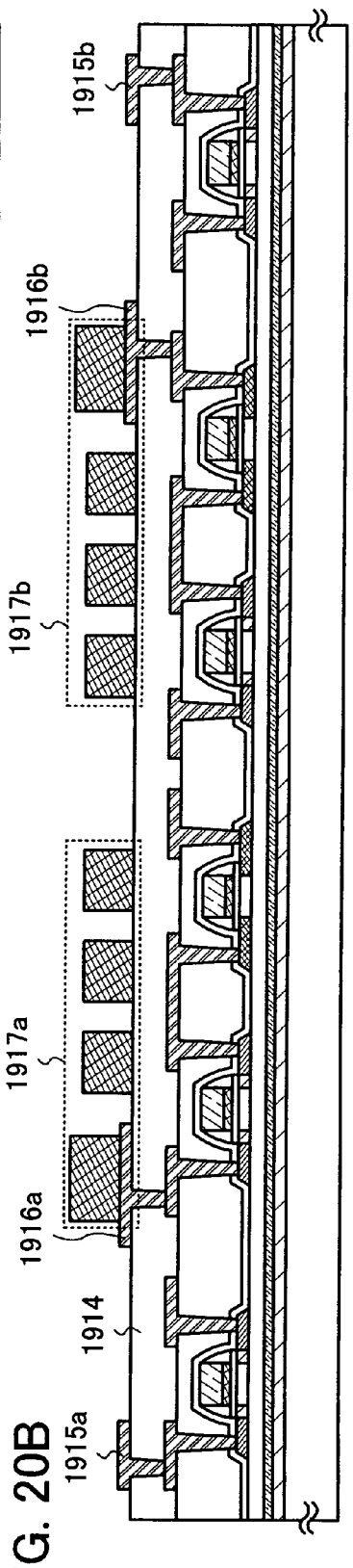

Subsequently, as illustrated in FIG. 20B, conductive films 1917*a* and 1917*b* functioning as antennas are formed so as to be electrically connected to the conductive films 1916*a* and 1916*b*, respectively. Here, one of the conductive films 1917*a* and 1917*b* functioning as the antennas corresponds to the antenna of the first antenna circuit described in the above embodiment mode, and the other corresponds to the antenna of the second antenna circuit. For example, when the conductive film 1917*a* is the antenna of the first antenna circuit and the conductive film 1917*b* is the antenna of the second antenna circuit, the thin film transistors 1900*a* to 1900*c* function as a first signal processing circuit, and the thin film transistors 1900d to 1900f function as a second signal processing circuit.

The insulating film 1914 can be formed as a single layer or stacked layers of an insulating film containing oxygen or nitrogen such as a silicon oxide ($SiO_x$) film, a silicon nitride ($SiN_x$) film, a silicon oxynitride ($SiO_xN_y$, x>y) film, or a silicon nitride oxide ($SiN_xO_y$, x>y) film; a film containing carbon such as DLC (Diamond Like Carbon); or a film made of an organic material such as epoxy resin, polyimide, polyamide, polyvinylphenol, benzocyclobutene-based resin, or acrylic resin, a siloxane material such as a siloxane resin by a CVD method, a sputtering method, or the like. The siloxane material is a material including a Si—O—Si bond. Siloxane is composed of a skeleton formed by the bond of silicon (Si) and oxygen (O), in which an organic group (such as an alkyl group or aromatic hydrocarbon) is contained as a substituent. Alternatively, a fluoro group may be used as the substituent.

In addition, the conductive films 1917a and 1917b are formed using a conductive material by a CVD method, a sputtering method, a printing method such as screen printing or gravure printing, a droplet discharging method, a dispenser method, a plating method, or the like. The conductive materials are formed as a single layer or stacked layers using an element of aluminum (Al), titanium (Ti), silver (Ag), copper (Cu), gold (Au), platinum (Pt), nickel (Ni), palladium (Pd), tantalum (Ta), or molybdenum (Mo), or an alloy or a compound including the above element as its main component.

For example, in a case of forming the conductive films 1917a and 1917b functioning as the antennas by a screen printing method, the conductive films can be formed by being selectively printed with conductive paste in which conductive particles each having a grain size of several nm to several tens of μm are dissolved or dispersed in an organic resin. As the conductive particle, a fine particle or a dispersive nanoparticle of one or more metals of silver (Ag), gold (Au), copper (Cu), nickel (Ni), platinum (Pt), palladium (Pd), tantalum (Ta), molybdenum (Mo), or titanium (Ti), or silver halide can be used. In addition, as the organic resin included in the conductive paste, one or a plurality of organic resins each functioning as a binder, a solvent, a dispersant, or a coating of the metal particle can be used. Typically, an organic resin such as an epoxy resin or a silicon resin can be used. In forming a conductive film, baking is preferably performed after the conductive paste is applied. For example, in a case of using fine particles (of which grain size is greater than or equal to 1 and less than or equal to 100 nm) containing silver as its main component as a material of the conductive paste, the conductive paste is cured by being baked at a temperature of 150 to 300° C. to give a conductive film. Alternatively, fine particles containing solder or lead-free solder as its main component may be used. In this case, it is preferable to use a fine particle having a grain size of less than or equal to 20 μm. Solder and lead-free solder have an advantage such as low cost.

In a subsequent step, the conductive films 1915a and 1915b can function as wirings electrically connected to a battery included in the wireless communication device of this embodiment mode. When the conductive films 1917a and 1917b functioning as the antennas are formed, another conductive film may be formed so as to be electrically connected to the conductive films 1915a and 1915b, and may be used a wiring connected to the battery. Note that the conductive films 1917a and 1917b in FIG. 20B correspond to the antenna of the first antenna circuit and the antenna of the second antenna circuit described in the above Embodiment Mode 1, respectively.

Figure 20C:
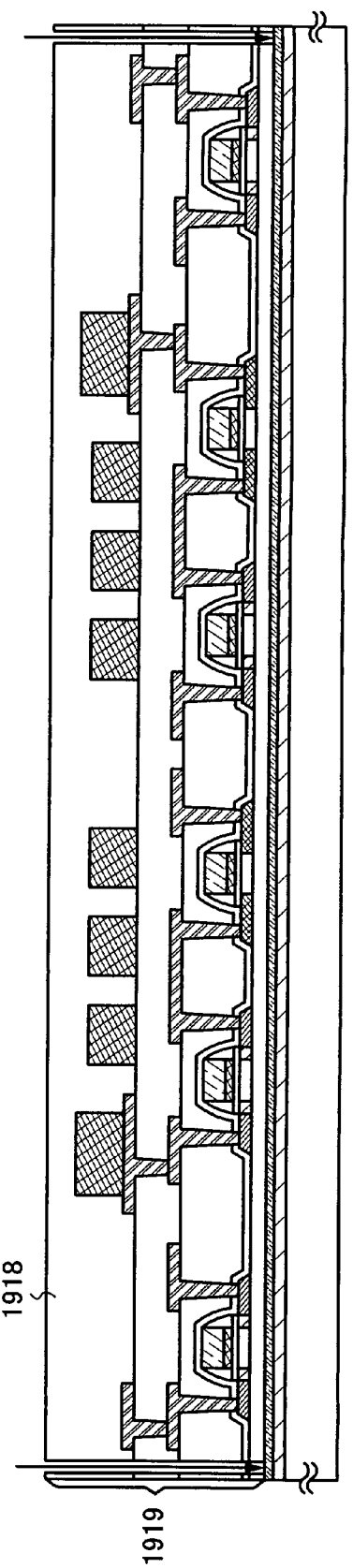

Next, as illustrated in FIG. 20C, after an insulating film 1918 is formed so as to cover the conductive films 1917a and 1917b, a layer including the thin film transistors 1900a to 1900f, the conductive films 1917a and 1917b, and the like (hereinafter also referred to as an "element formation layer 1919") is peeled from the substrate 1901. Here, openings are formed by laser light (such as UV light) irradiation in a region where the thin film transistors 1900a to 1900f are not formed, and then, the element formation layer 1919 can be peeled from the substrate 1901 with physical force. Alternatively, etchant may be introduced to the openings before the element formation layer 1919 is peeled from the substrate 1901 so as to selectively remove the peeling layer 1903. As the etchant, gas or a liquid containing halogen fluoride or an interhalogen compound is used. For example, chlorine trifluoride ($ClF_3$) is used as gas containing halogen fluoride, by which the element formation layer 1919 is peeled from the substrate 1901. Note that the peeling layer 1903 may be partially left instead of being removed entirely. Thus, consumption of the etchant can be reduced and process time for removing the peeling layer can be shortened. In addition, the element formation layer 1919 can be retained over the substrate 1901 even after the peeling layer 1903 is etched by etchant. The substrate 1901 is preferably reused after the element formation layer 1919 is peeled, so that the cost can be reduced.

The insulating film 1918 can be formed as a single layer or stacked layers of an insulating film containing oxygen or nitrogen such as a silicon oxide ($SiO_x$) film, a silicon nitride ($SiN_x$) film, a silicon oxynitride ($SiO_xN_y$, x>y) film, or a silicon nitride oxide ($SiN_xO_y$, x>y) film; a film containing carbon such as DLC (Diamond Like Carbon); or a film made of an organic material such as epoxy, polyimide, polyamide, polyvinylphenol, benzocyclobutene-based resin, or acrylic resin; and a siloxane material such as a siloxane resin by a CVD method, a sputtering method, or the like.

Figure 21A:
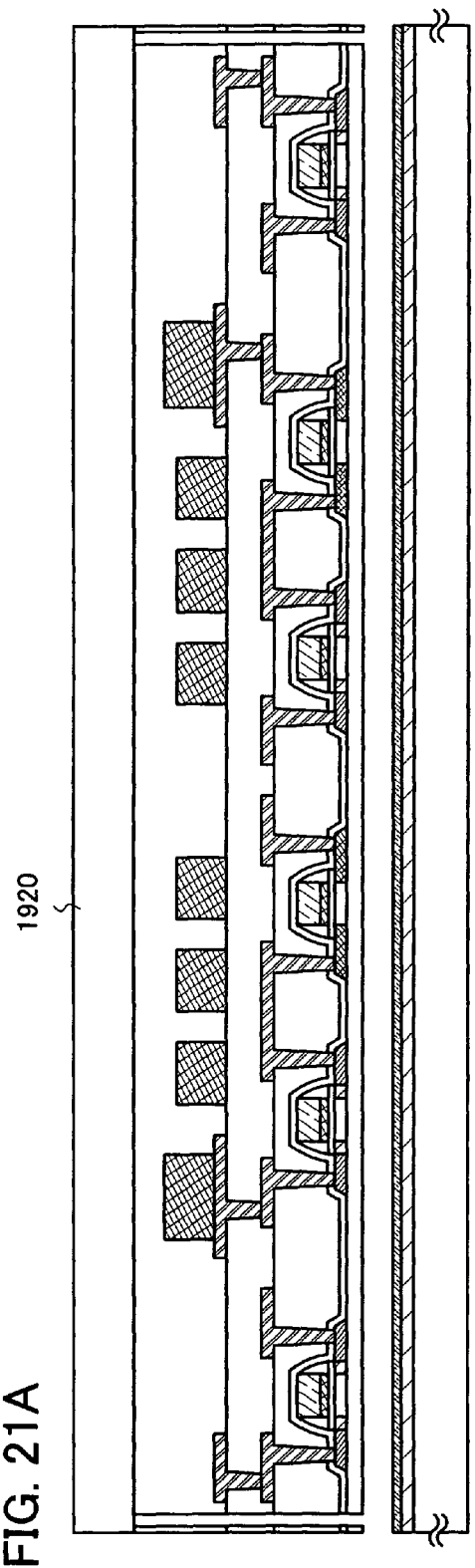
FIGS. 21A and 21B illustrate one example of a manufacturing method of a wireless communication device of the present invention.

In this embodiment mode, as illustrated in FIG. 21A, after an opening is formed in the element formation layer 1919 by irradiation with laser light, a first sheet material 1920 is attached to one surface of the element formation layer 1919 (the exposed surface of the insulating film 1918). Then, the element formation layer 1919 is peeled from the substrate 1901.

Figure 21B:
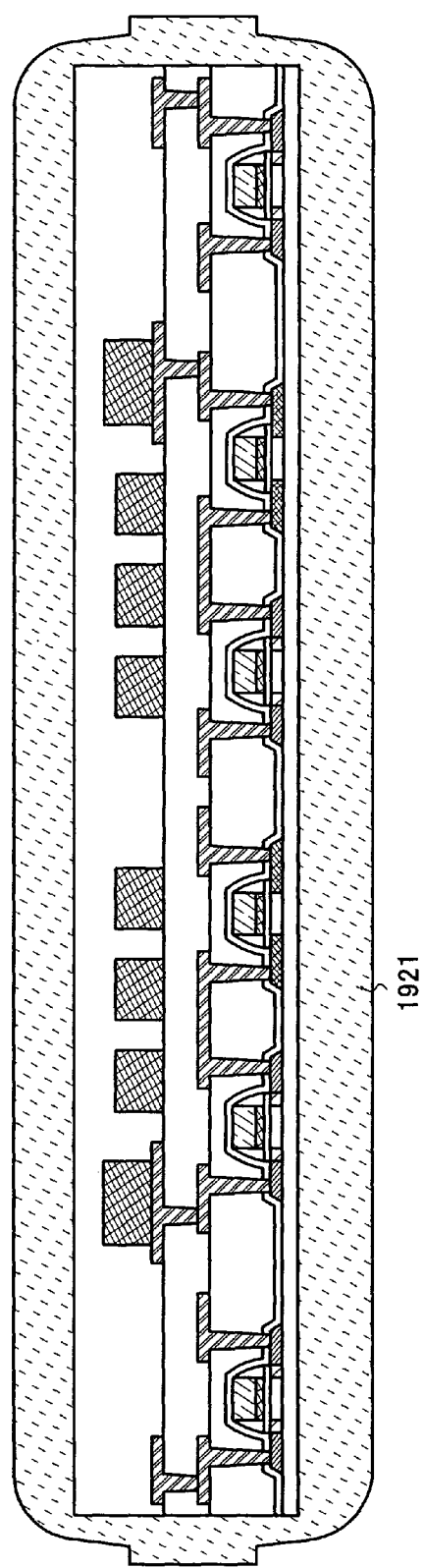

Next, as illustrated in FIG. 21B, a second sheet material 1921 is attached to the other surface of the element formation layer 1919 (a surface exposed by peeling) by one or both heat treatment and pressure treatment. As the first sheet material 1920 and the second sheet material 1921, a hot-melt film or the like can be used.

As the first sheet material 1920 and the second sheet material 1921, a film on which antistatic treatment for preventing static electricity or the like is performed (hereinafter described as an antistatic film) can also be used. As the antistatic film, a film with an antistatic material dispersed in a resin, a film with an antistatic material attached thereon, and the like can be given. The film provided with an antistatic material may be a film with an antistatic material provided over one of its sides, or a film with an antistatic material provided over each of its sides. Further, the film with an antistatic material provided on one of its sides may be attached to the layer so that the antistatic material is placed inside or outside of the film. Note that the antistatic material may be provided over the entire surface of the film, or over part of the film. As the antistatic material here, a metal, indium tin oxide (ITO), or a surfactant such as an amphoteric surfactant, a cationic surfactant, or a nonionic surfactant can be used. Alternatively, as the antistatic material, a resin material containing cross-linked polymer having a carboxyl group and a quaternary ammonium moiety on its side chain, or the like can be used. Such a material is attached, mixed, or coated to a film, so that an antistatic film can be formed. The sealing is performed using the antistatic film; thus, a semiconductor element can be prevented from being adversely affected due to static electricity from outside when dealt with as a commercial product.

The battery is formed so as to be connected to the conductive films 1915a and 1915b. The battery may be connected to the conductive films 1915a and 1915b before or after the element formation layer 1919 is peeled from the substrate 1901 (a phase in FIG. 20B or 20C, or a phase in FIG. 21A), or after the element formation layer 1919 is sealed with the first sheet material and the second sheet material (a phase in FIG. 21B). Hereinafter, an example in which the element formation layer 1919 and the battery are connected to each other will be described with reference to FIGS. 22A and 22B and FIGS. 23A and 23B.

In FIG. 20B, conductive films 1931a and 1931b electrically connected to the conductive films 1915a and 1915b, respectively, are formed at the same time as the conductive films 1917a and 1917b functioning as the antennas. After the insulating layer 1918 is formed so as to cover the conductive films 1917a, 1917b, 1931a and 1931b, openings 1932a and 1932b are formed so that surfaces of the conductive films 1931a and 1931b are exposed. Thereafter, as illustrated in FIG. 22A, after an opening is formed in the element formation layer 1919 by irradiation with laser light, a first sheet material 1920 is attached to one surface of the element formation layer 1919 (the exposed surface of the insulating film 1918). Then, the element formation layer 1919 is peeled from the substrate 1901.

Next, as illustrated in FIG. 22B, the second sheet material 1921 is attached to the other surface of the element formation layer 1919 (the surface exposed by peeling), and then, the element formation layer 1919 is peeled from the first sheet material 1920. Therefore, the first sheet material 1920 that has low adhesion is used here. Subsequently, conductive films 1934a and 1934b which are electrically connected to the conductive films 1931a and 1931b are selectively formed through the openings 1932a and 1932b.

The conductive films 1934a and 1934b are formed using a conductive material by a CVD method, a sputtering method, a printing method such as screen printing or gravure printing, a droplet discharging method, a dispenser method, a plating method, or the like. The conductive material is formed as a single layer or stacked layers using an element of aluminum (Al), titanium (Ti), silver (Ag), copper (Cu), gold (Au), platinum (Pt), nickel (Ni), palladium (Pd), tantalum (Ta), or molybdenum (Mo), or an alloy or a compound including the above element as its main component.

Note that the example is described here in which, after the element formation layer 1919 is peeled from the substrate 1901, the conductive films 1934a and 1934b are formed. Alternatively, the element formation layer 1919 may be peeled from the substrate 1901 after formation of the conductive films 1934a and 1934b.

Figure 23A:
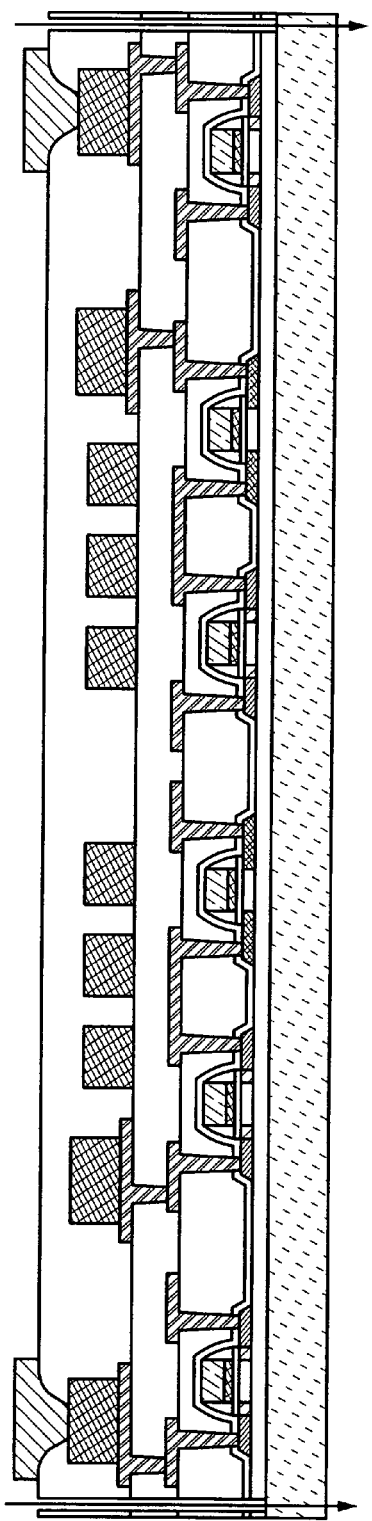
FIGS. 23A and 23B illustrate one example of a manufacturing method of a wireless communication device of the present invention.

Subsequently, as illustrated in FIG. 23A, when a plurality of elements are formed over the substrate, each element of the element formation layer 1919 is divided. A laser irradiation apparatus, a dicing apparatus, a scribing apparatus, or the like can be used for dividing. Here, each of the plurality of elements formed over one substrate is divided by irradiation with laser light.

Figure 23B:
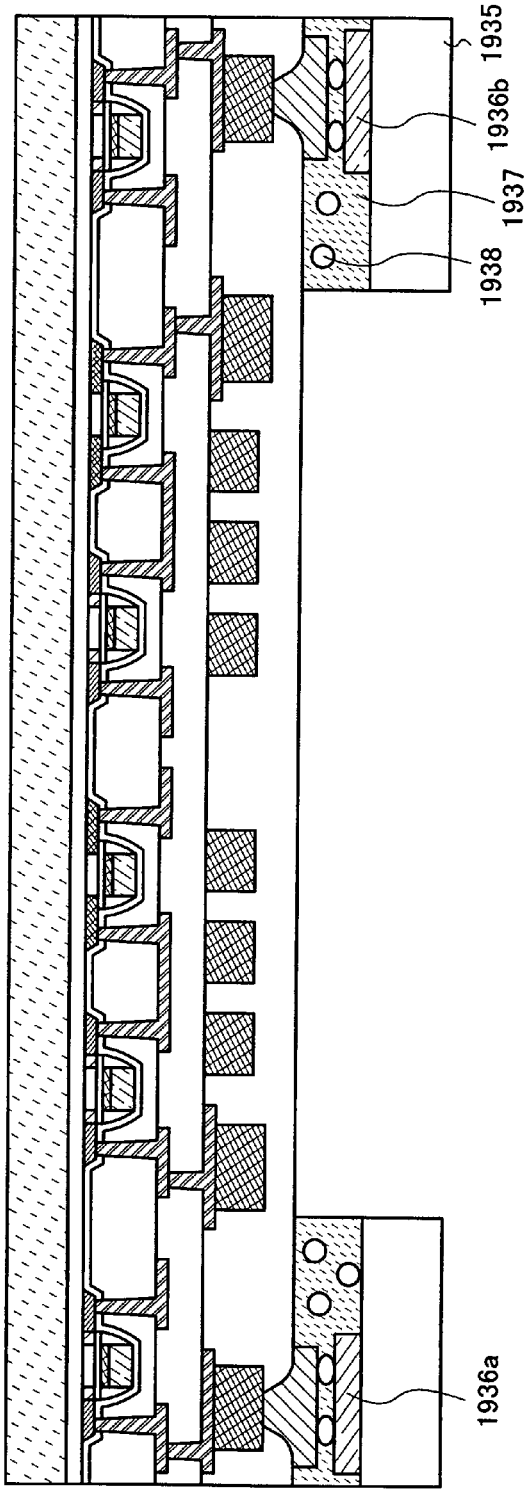

Next, as illustrated in FIG. 23B, the divided element is electrically connected to a connecting terminal of the battery. Here, the conductive films 1934a and 1934b which are provided over the element formation layer 1919 are connected to conductive films 1936a and 1936b, respectively, which are provided as connecting terminals over a substrate 1935. Here, a case is shown, in which the conductive films 1934a and 1936a or the conductive films 1934b and 1936b are electrically connected to each other by being pressure-bonded with an adhesive material such as an anisotropic conductive film (ACF) or anisotropic conductive paste (ACP). In this case, an example is shown in which the connection is made using a conductive particle 1938 included in an adhesive resin 1937. Alternatively, a conductive adhesive such as a silver paste, a copper paste, or a carbon paste; solder joint; or the like can also be used for the connection.

In a case where a battery is larger than an element, as illustrated in FIGS. 22A and 22B and FIGS. 23A and 23B, a plurality of elements can be formed over one substrate, and the elements which have been divided are connected to the battery. Accordingly, the number of elements which can be formed over one substrate can be increased, which enables the manufacture of a semiconductor device at lower cost.

Through the above steps, the wireless communication device can be manufactured. Note that, in this embodiment mode, a process in which, after being formed over a substrate, an element such as a thin film transistor is peeled is described. However, an element formed over a substrate may be used as a product without being peeled from the substrate. Moreover, after an element such as a thin film transistor is formed over a glass substrate, the glass substrate can be polished from an opposite side of a surface on which the element is formed. Alternatively, after a MOS transistor can be formed using a semiconductor substrate such as Si, the semiconductor substrate is polished, so that reduction in film thickness and size of the wireless communication device can be achieved.

Note that the wireless communication device described in this embodiment mode can be implemented in combination with structures of wireless communication devices that will be described in other embodiment modes in this specification.

Embodiment Mode 5

In this embodiment mode, uses of an RFID tag, which is an example of application modes of a wireless communication device of the present invention, will be explained. An RFID tag can be used as a so-called ID label, ID tag, or ID card provided in, for example, bills, coins, securities, bearer bonds, documents (such as driver's licenses or resident's cards), packaging containers (such as wrapping paper or bottles), storage media (such as a DVD or video tapes), vehicles (such as bicycles), personal belongings (such as bags or glasses), foods, plants, animals, human bodies, clothing, everyday articles, tags on products such as an electronic device or on packs. An electronic device refers to a liquid crystal display device, an EL display device, a television set (also simply called a TV set, a TV receiver, or a television receiver), a cellular phone, and the like. Hereinafter, an application of the present invention and an example of a product with the RFID tag are described with reference to FIG. 17.

Figure 17A:
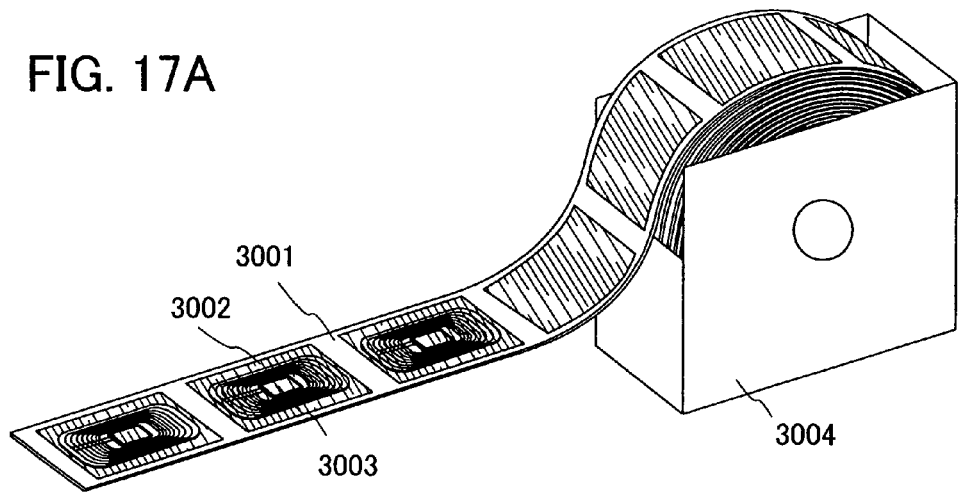
FIGS. 17A to 17E each illustrate one example of an application mode of a wireless communication device of the present invention.

FIG. 17A illustrates an example of a state of completed products of RFID tags of the present invention. On a label board (separate paper) 3001, a plurality of ID labels 3003 each incorporating an RFID tag 3002 are formed. The ID labels 3003 are held in a box 3004. In addition, on the ID label 3003, information on a product or service (a name of the product, a brand, a trademark, a trademark owner, a seller, a manufacturer, and the like) is written, while an ID number that is unique to the product (or the kind of the product) is assigned to the incorporated RFID tag to make it possible to easily figure out forgery, infringement of intellectual property rights such as a patent right and a trademark right, and illegality such as unfair competition. Moreover, a lot of information that cannot be fully written on a container of the product or the label, for example, the production area, selling area, quality, raw material, efficacy, use, quantity, shape, price, production method, usage, time of the production, time of the use, expiration date, instructions of the product, information on the intellectual property of the product, or the like can be inputted in the RFID tag so that traders and consumers can access the information using a simple reader. Although producers can easily rewrite or delete the information, traders and consumers are not allowed to rewrite or delete the information. Note that a structure may be employed in which the RFID tag is provided with a display portion so that such information can be displayed.

Figure 17B:
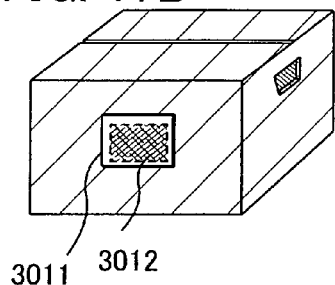

FIG. 17B illustrates a label-shaped RFID tag 3011 incorporating an RFID tag 3012. By being provided with the RFID tag 3011, the products can be managed easily. For example, in the case where the product is stolen, the pathway of the product can be traced, so that the criminal who stole the product can be figured out quickly. By thus being provided with the RFID tag, products that are superior in so-called traceability can be distributed.

Figure 17C:
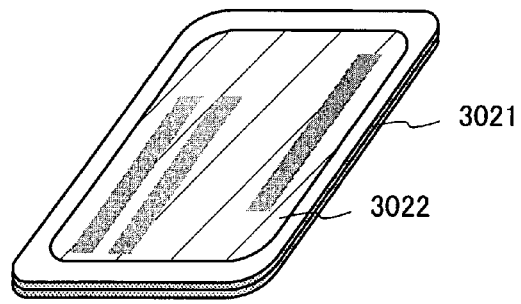

FIG. 17C illustrates an example of a state of a completed product of an ID card 3021 including an RFID tag 3022 of the present invention. The ID card 3021 includes all kinds of cards such as a cash card, a credit card, a prepaid card, an electronic ticket, electronic money, a telephone card, and a membership card. In addition, a structure may be employed in which the front side of the ID card 3021 is provided with a display portion to display a wide range of information.

Figure 17D:
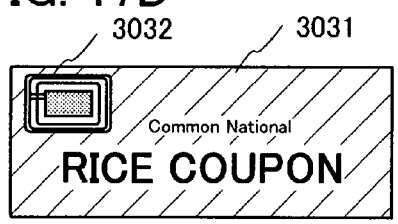

FIG. 17D illustrates an example of a state of a completed product of a bearer bond 3031. An RFID tag 3032 is embedded in the bearer bond 3031 and is protected by a resin formed in the periphery thereof. Here, the resin is filled with a filler. The bearer bond 3031 can be formed in the same manner as an RFID tag of the present invention. Note that the above bearer bond includes stamps, tickets, admission tickets, merchandise coupons, book coupons, stationery coupons, beer coupons, rice coupons, various gift coupons, various service coupons, and the like. Note that the bearer bond is not limited thereto. In addition, when the RFID tag 3032 of the present invention is provided in bills, coins, securities, bearer bonds, documents, or the like, an authentication function can be provided; therefore, forgery can be prevented with the utilization of the authentication function.

Figure 17E:
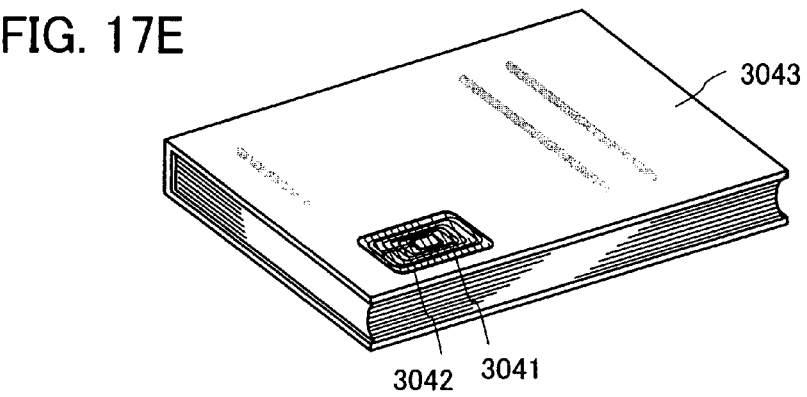

FIG. 17E illustrates a book 3043 to which an ID label 3041 including an RFID tag 3042 of the present invention is attached. The RFID tag 3042 of the present invention is fixed on goods by, for example, being attached to a surface or embedded therein. As illustrated in FIG. 17E, the RFID tag 3042 can be embedded in paper of a book, or embedded in an organic resin of a package. Since the RFID tag 3042 of the present invention can realize a small size, a thin shape, and lightweight, the RFID tag can be fixed on goods without spoiling the design thereof.

In addition, although not illustrated here, the efficiency of a system such as an inspection system can be improved by provision of the RFID tag of the present invention in, for example, packaging containers, storage media, personal belongings, foods, clothing, everyday articles, electronic appliances, or the like. In addition, counterfeits and theft can be prevented by provision of the RFID tag on vehicles. Individual creatures such as animals can be easily identified by being implanted with the RFID tag. For example, year of birth, sex, breed, or the like can be easily identified by implantation of the RFID tag in creatures such as domestic animals.

Figure 18A:
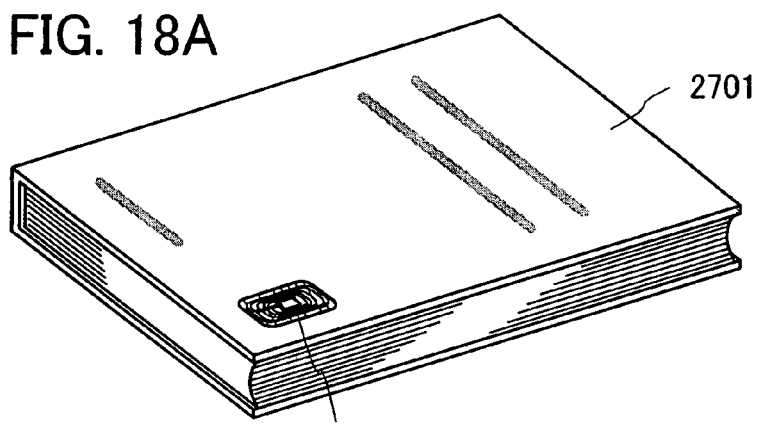
FIGS. 18A to 18D each illustrate one example of an application mode of a wireless communication device of the present invention.
Figure 18B:
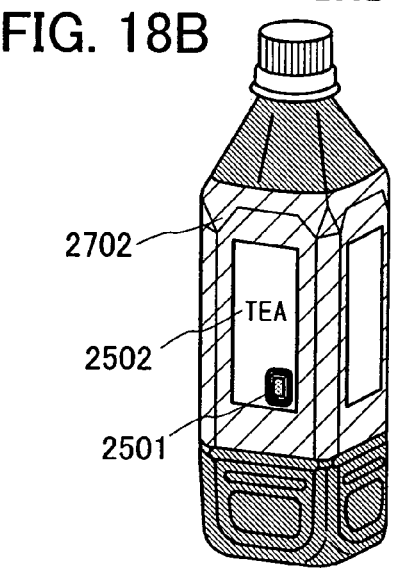

FIGS. 18A and 18B respectively illustrate a book 2701 and a plastic bottle 2702 to which an ID label 2502 including the RFID tags described in the above embodiment modes is attached. The RFID tag is quite thin; therefore, even when the ID label is mounted on goods such as the book, the function or design is not spoiled. Further, in a case of a non-contact type thin film integrated circuit device, an antenna and a chip can be formed over one substrate to facilitate direct transfer of the non-contact type thin film integrated circuit device to a product with a curved surface.

Figure 18C:
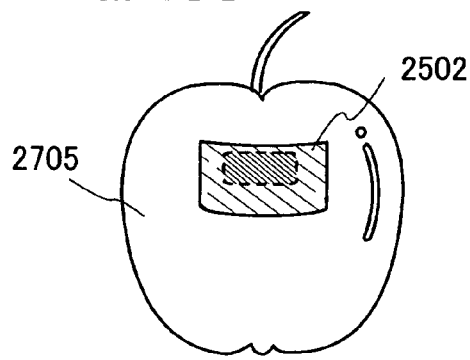
Figure 18D:
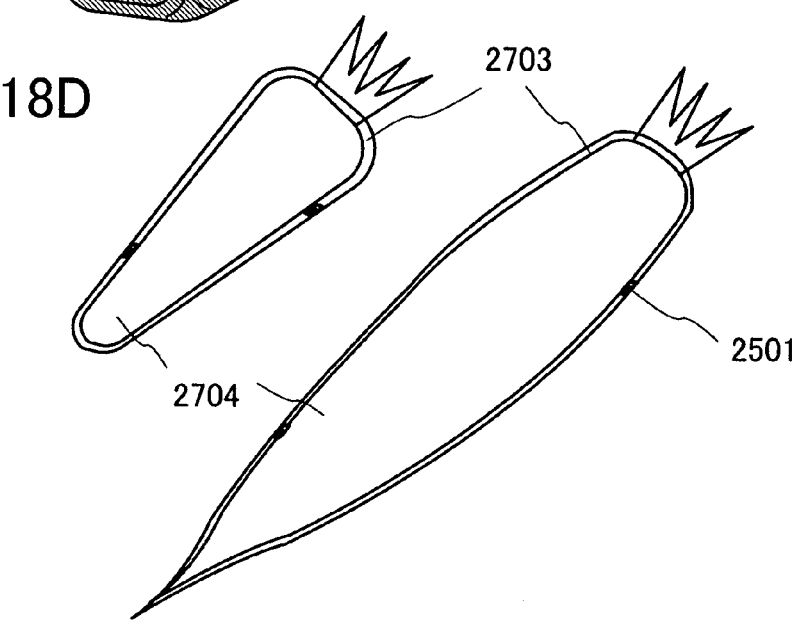

FIG. 18C illustrates a state in which the ID label 2502 is directly attached to a fresh food such as a fruit 2705. In addition, FIG. 18D illustrates an example in which fresh foods such as vegetables 2704 are each wrapped in a wrapping film 2703. When a chip 2501 is attached to a product, there is a possibility that the chip is maliciously peeled. However, when the product is wrapped in the wrapping film 2703, it is difficult to peel the wrapping film 2703, which results in merit for security. Note that a wireless communication device of the present invention can be utilized for various products in addition to the above products.

This application is based on Japanese Patent Application serial no. 2006-236921 filed in Japan Patent Office on 31st, Aug. in 2006, the entire contents of which are hereby incorporated by reference.

What is claimed is:

1. A wireless communication device comprising:
  an antenna circuit electrically connected to a first switch, which is electrically connected to a first battery, which is electrically connected to a first circuit in series; and
  the antenna circuit being electrically connected to a second switch, which is electrically connected to a second battery, which is electrically connected to a second circuit in series;
  wherein the first and second batteries are capable of being charged by reception of a radio wave by the antenna circuit.

2. The wireless communication device according to claim 1,
  wherein the antenna circuit receives a radio wave by an electromagnetic induction method.

3. The wireless communication device according to claim 1,
  wherein the first and second batteries are selected from a lithium battery, a nickel-metal-hydride battery, a nickel-cadmium battery, or an organic-radical battery.

4. The wireless communication device according to claim 1,
  wherein a ceramic capacitor, a double-layer electrolytic capacitor or a multilayer ceramic capacitor is provided instead of at least one of the first and second batteries.

5. The wireless communication device according to claim 1,
  wherein at least one of the first and second circuits comprises a pixel portion.

6. The wireless communication device according to claim 1,
  wherein at least one of the first and second circuits comprises a pixel portion, and
  wherein the pixel portion has an electroluminescence element or a liquid crystal element.

7. A wireless communication device comprising:
- a first antenna circuit electrically connected to a first switch, which is electrically connected to a first battery, which is electrically connected to a first circuit in series; and
- a second antenna circuit electrically connected to a second switch, which is electrically connected to a second battery, which is electrically connected to a second circuit in series,
- wherein the first and second batteries are capable of being charged by reception of a radio wave by the first and second antenna circuits, respectively.

8. The wireless communication device according to claim 7,
- wherein at least one of the first and second antenna circuits receives a radio wave by an electromagnetic induction method.

9. The wireless communication device according to claim 7,
- wherein the first and second batteries are selected from a lithium battery, a nickel-metal-hydride battery, a nickel-cadmium battery, or an organic-radical battery.

10. The wireless communication device according to claim 7,
- wherein a ceramic capacitor, a double-layer electrolytic capacitor or a multilayer ceramic capacitor is provided instead of at least one of the first and second batteries.

11. The wireless communication device according to claim 7,
- wherein at least one of the first and second antenna circuits receives a radio wave having a different frequency.

12. The wireless communication device according to claim 7,
- wherein at least one of the first and second circuits comprises a pixel portion.

13. The wireless communication device according to claim 7,
- wherein at least one of the first and second circuits comprises a pixel portion, and
- wherein the pixel portion has an electroluminescence element or a liquid crystal element.

14. The wireless communication device according to claim 7, further comprising first and second communication control circuits,
- wherein the first and second communication control circuits are electrically connected with the first and second antenna circuits, respectively, and
- wherein the first and second communication control circuits transmit data outside through the first and second antenna circuits, respectively.

15. The wireless communication device according to claim 7, wherein the first and second antenna circuits each include a different antenna.

16. A wireless communication device comprising:
- a first antenna circuit, a second antenna circuit, and a third antenna circuit;
- a first battery electrically connected in series with the first antenna circuit through first switch and electrically connected in series with the second antenna circuit through a second switch; and
- a second battery electrically connected in series with the third antenna circuit through a third switch,
- wherein the first battery is capable of being charged by reception of a radio wave by at least one of the first antenna circuit and the second antenna circuit and the second battery is capable of being charged by reception of a radio wave by the third antenna circuit, and
- wherein the first battery and the second battery are electrically connected with a first circuit and a second circuit, respectively.

17. The wireless communication device according to claim 16,
- wherein at least one of the first antenna circuit, the second antenna circuit, and the third antenna circuit receives a radio wave by an electromagnetic induction method.

18. The wireless communication device according to claim 16,
- wherein the first battery and the second battery are selected from a lithium battery, a nickel-metal-hydride battery, a nickel-cadmium battery, or an organic-radical battery.

19. The wireless communication device according to claim 16,
- wherein a ceramic capacitor, a double-layer electrolytic capacitor or a multilayer ceramic capacitor is provided instead of at least one of the first battery and the second battery.

20. The wireless communication device according to claim 16,
- wherein the first antenna circuit and the second antenna circuit each receive a radio wave having a different frequency.

21. The wireless communication device according to claim 16,
- wherein at least one of the first circuit and the second circuit comprises a pixel portion.

22. The wireless communication device according to claim 16,
- wherein at least one of the first circuit and the second circuit comprises a pixel portion, and
- wherein the pixel portion has an electroluminescence element or a liquid crystal element.

23. The wireless communication device according to claim 16, wherein the first, second and third antenna circuits each include a different antenna.

24. A wireless communication device comprising:
- a first antenna circuit and a second antenna circuit;
- a signal processing circuit electrically connected with the first antenna circuit and the second antenna circuit; and
- a first battery which is capable of being charged by reception of a radio wave by the first antenna circuit, and a second battery which is capable of being charged by reception of a radio wave by the second antenna circuit,
- wherein the first antenna circuit transmits and receives a signal for transmitting and receiving data stored in the signal processing circuit outside, and
- wherein the first battery and the second battery each supply electric power to a different circuit provided in the signal processing circuit.

25. The wireless communication device according to claim 24,
- wherein at least one of the first antenna circuit and the second antenna circuit receives a radio wave by an electromagnetic induction method.

26. The wireless communication device according to claim 24,
- wherein the first battery and the second battery are selected from a lithium battery, a nickel-metal-hydride battery, a nickel-cadmium battery, or an organic-radical battery.

27. The wireless communication device according to claim 24,
- wherein a ceramic capacitor, a double-layer electrolytic capacitor or a multilayer ceramic capacitor is provided instead of at least one of the first battery and the second battery.

28. The wireless communication device according to claim 24, wherein the first antenna circuit and the second antenna circuit each receive a radio wave having a different frequency.

29. The wireless communication device according to claim 24, wherein the first and second antenna circuits each include a different antenna.

* * * * *

UNITED STATES PATENT AND TRADEMARK OFFICE
CERTIFICATE OF CORRECTION

| | | |
|---|---|---|
| PATENT NO. | : 8,463,332 B2 | Page 1 of 1 |
| APPLICATION NO. | : 11/892343 | |
| DATED | : June 11, 2013 | |
| INVENTOR(S) | : Sato et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1243 days.

Signed and Sealed this
Thirtieth Day of December, 2014

Michelle K. Lee
*Deputy Director of the United States Patent and Trademark Office*